(12) United States Patent
Chen et al.

(10) Patent No.: US 11,909,277 B2
(45) Date of Patent: Feb. 20, 2024

(54) MOTOR, POWER ASSEMBLY, AND MOTOR DRIVE DEVICE

(71) Applicant: Huawei Digital Power Technologies Co., Ltd., Shenzhen (CN)

(72) Inventors: Zhenxing Chen, Shenzhen (CN); Guoquan Yu, Xi'an (CN); Wenwu Ma, Dongguan (CN); Chao Cao, Xi'an (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 64 days.

(21) Appl. No.: 17/708,792

(22) Filed: Mar. 30, 2022

(65) Prior Publication Data
US 2022/0255407 A1 Aug. 11, 2022

(30) Foreign Application Priority Data
Mar. 31, 2021 (CN) .......................... 202110354554.1

(51) Int. Cl.
*H02K 11/40* (2016.01)
*B60K 1/00* (2006.01)
*H02K 7/00* (2006.01)

(52) U.S. Cl.
CPC ................ *H02K 11/40* (2016.01); *B60K 1/00* (2013.01); *H02K 7/003* (2013.01)

(58) Field of Classification Search
CPC ........... H02K 11/40; H02K 7/003; B60K 1/00
USPC .......................................................... 310/71
See application file for complete search history.

(56) References Cited

U.S. PATENT DOCUMENTS

| 8,963,398 | B2* | 2/2015 | Roman ................. H02K 11/40 310/239 |
| 2010/0127585 | A1 | 5/2010 | Fee et al. |
| 2010/0314184 | A1* | 12/2010 | Stenberg ................. B60K 1/04 180/65.6 |
| 2015/0270761 | A1 | 9/2015 | Post et al. |
| 2018/0083509 | A1 | 3/2018 | Yang et al. |
| 2018/0175695 | A1 | 6/2018 | Tejano et al. |
| 2020/0295634 | A1 | 9/2020 | Lenz et al. |
| 2022/0209616 | A1 | 6/2022 | Wang et al. |

FOREIGN PATENT DOCUMENTS

| CN | 203632426 U | 6/2014 |
| CN | 107947492 A | 4/2018 |
| CN | 108886296 A | 11/2018 |
| CN | 109314445 A | 2/2019 |
| CN | 209805062 U | 12/2019 |
| CN | 112572144 A | 3/2021 |
| DE | 102005045959 A1 | 4/2007 |
| DE | 102015218521 A1 | 9/2016 |

(Continued)

*Primary Examiner* — Terrance L Kenerly
(74) *Attorney, Agent, or Firm* — Conley Rose, P.C.

(57) ABSTRACT

A motor includes a grounding ring and a first sealing piece, or includes a grounding ring, a first sealing piece, and a second sealing piece. The grounding ring is electrically coupled to a rotating shaft and a housing. The grounding ring is made of a material with good conduction performance, hence, a shaft induced voltage transmitted on the rotating shaft is transmitted to the housing through the grounding ring, instead of being transmitted to the housing through a motor bearing.

20 Claims, 12 Drawing Sheets

(56) References Cited

FOREIGN PATENT DOCUMENTS

| | | |
|---|---|---|
| DE | 102016010926 A1 | 9/2017 |
| DE | 102016207672 A1 | 11/2017 |
| EP | 1755207 A2 | 2/2007 |
| JP | 2017060401 A | 3/2017 |
| WO | 2007036436 A1 | 4/2007 |

* cited by examiner

MOTOR, POWER ASSEMBLY, AND MOTOR DRIVE DEVICE

CROSS-REFERENCE TO RELATED APPLICATIONS

This application claims priority to Chinese Patent Application No. 202110354554.1, filed on Mar. 31, 2021, which is hereby incorporated by reference in its entirety.

TECHNICAL FIELD

This disclosure relates to the field of motor technologies, and in particular, to a motor, a power assembly, and a motor drive device.

BACKGROUND

With rapid development of electric vehicle technologies, there is a higher requirement on a drive motor of an electric vehicle. When a motor works, a shaft induced voltage is usually generated, and the shaft induced voltage is transmitted to an inner ring of a motor bearing through a rotating shaft of the motor, reaches a housing of the motor after sequentially passing through a rolling body between the inner ring and an outer ring of the motor bearing and the outer ring of the motor bearing, and then is grounded through the housing. When the shaft induced voltage transmitted to the motor bearing exceeds a breakdown threshold of lube oil or grease film in the motor bearing, partial discharge occurs between the rolling body of the motor bearing and the inner ring of the motor bearing or between the rolling body and the outer ring of the motor bearing, and an electric melting pit is formed on a surface that is of the inner ring of the motor bearing and that faces the rolling body or a surface that is of the outer ring of the motor bearing and that faces the rolling body, that is, electric corrosion of the bearing occurs. The electric corrosion of the bearing aggravates damage to the motor bearing in a running process of the motor, and specific bearing order noise and high-frequency noise are caused, resulting in loud working noise of the motor or even a bearing failure and power interruption.

In a conventional method for eliminating a shaft induced voltage of a motor, an insulating bearing is used as a motor bearing, that is, an insulating coating is added to an inner ring or an outer ring of the motor bearing or an insulating bearing such as a ceramic ball bearing is used, to avoid transmission of the shaft induced voltage to the insulating motor bearing and grounding through the motor bearing, so as to avoid electric corrosion of the bearing. However, the price of the insulating bearing is relatively high, resulting in an increase in costs of the motor. Alternatively, a conductive bearing for eliminating a shaft induced voltage is installed at one end of a rotating shaft of the motor, so that the shaft induced voltage is transmitted to a housing of the motor through the conductive bearing. However, in an oil-cooled motor system or a water-cooled motor system, because of scouring of cooling oil or cooling water, conduction performance of the conductive bearing is affected. Consequently, the conductive bearing fails prematurely, and the motor bearing cannot be protected for a long time.

SUMMARY

This disclosure provides a motor, so that a motor bearing of the motor can be protected from bearing electric corrosion for a relatively long time while relatively low costs are used, thereby ensuring a lifetime of the motor bearing.

According to a first aspect, this disclosure provides a motor. The motor includes a housing, a rotating shaft, a grounding ring, and a first sealing piece, and both the grounding ring and the first sealing piece are accommodated in the housing. The grounding ring is a conductive structure, and the grounding ring is electrically connected to the rotating shaft and the housing. The first sealing piece seals a part of space in the housing to obtain sealing space, and the grounding ring is located in the sealing space.

In this disclosure, the grounding ring is electrically connected to the rotating shaft and the housing. Because the grounding ring is made of a material with good conduction performance and has better conduction performance than a motor bearing, a shaft induced voltage transmitted on the rotating shaft can be transmitted to the housing through the grounding ring, instead of being transmitted to the housing through the motor bearing, thereby avoiding bearing electric corrosion of the motor bearing and ensuring quality and a service life of the motor bearing. In addition, the grounding ring in this implementation is made of a conductive ring and a conductive fiber ring. Compared with an insulating bearing and a conductive bearing, the grounding ring has lower costs, a simpler structure, and a lower weight. Therefore, a structure of the motor can be simplified, and manufacturing costs and a weight of the motor can be reduced. In this disclosure, the motor further includes the first sealing piece, the part of space in the housing is sealed by using the first sealing piece to obtain the sealing space, and the grounding ring is located in the sealing space. This can avoid impact on conduction performance of the grounding ring that is caused when cooling water or cooling oil in the motor, an external impurity, or the like is attached to the grounding ring. Therefore, it is ensured that the grounding ring can maintain good conduction performance for a long time, so that the shaft induced voltage on the rotating shaft can be easily transmitted to the housing through the grounding ring, to avoid bearing electric corrosion caused when the shaft induced voltage is transmitted to the housing through the motor bearing, and prolong the service life of the motor bearing.

In some implementations, the rotating shaft includes an axial cavity, the axial cavity includes a first opening, the motor further includes a conductive pillar, the conductive pillar includes a first end and a second end that are opposite to each other, the first end of the conductive pillar extends into the axial cavity from the first opening, the first end of the conductive pillar is fastened to the rotating shaft and electrically connected to the rotating shaft, both the first sealing piece and the grounding ring are annular, both the first sealing piece and the grounding ring are sleeved on the second end of the conductive pillar, inner ring surfaces of both the first sealing piece and the grounding ring are in contact with the conductive pillar, and the grounding ring is located on a side that is of the first sealing piece and that is away from the first end of the conductive pillar.

In this implementation, the first end of the conductive pillar is fastened to the rotating shaft and electrically connected to the rotating shaft, and the grounding ring is sleeved on the second end of the conductive pillar, so that a shaft induced voltage transmitted on the rotating shaft can be transmitted to the grounding ring through the conductive pillar, that is, the grounding ring is electrically connected to the rotating shaft through the conductive pillar.

In some implementations, the motor further includes a conductive support, the conductive support is connected to the housing, the conductive support is located on a side that is of the second end of the conductive pillar and that is opposite to the first end, a groove is disposed on the conductive support, an opening of the groove faces the conductive pillar, the second end of the conductive pillar extends into the groove, the first sealing piece seals the groove to form the sealing space, and an outer ring surface of the grounding ring is in contact with an inner wall surface of the groove.

In this implementation, the outer ring surface of the grounding ring is in contact with the inner wall surface of the groove, that is, the grounding ring is electrically connected to the conductive support in this implementation. Because the conductive support is connected to the housing, the grounding ring can be electrically connected to the housing through the conductive support. Therefore, in this implementation, a transmission path of a shaft induced voltage on the rotating shaft is the rotating shaft, the conductive pillar, the grounding ring, the conductive support, and the housing in sequence. This avoids a case in which the shaft induced voltage transmitted on the rotating shaft is transmitted to the housing through a motor bearing, and avoids bearing electric corrosion of the motor bearing. In addition, in this implementation, an outer ring surface of the first sealing piece is in contact with the inner wall surface of the groove, and an inner ring surface of the first sealing piece is in contact with the conductive pillar, so that the first sealing piece seals the groove to form sealing space. The grounding ring is located on a side that is of the first sealing piece and that is away from the first end of the conductive pillar, so that the grounding ring is located in the sealing space. This avoids impact on conduction performance of the grounding ring that is caused when cooling water or cooling oil in the motor, an external impurity, or the like is attached to the grounding ring. Therefore, it is ensured that the grounding ring can maintain good conduction performance for a long time, so that the shaft induced voltage on the rotating shaft can be easily transmitted to the housing through the grounding ring, to avoid bearing electric corrosion caused when the shaft induced voltage is transmitted to the housing through the motor bearing, and prolong the service life of the motor bearing.

In some implementations, the first sealing piece is in an interference fit with the conductive support and the second end of the conductive pillar, and the grounding ring is in an interference fit with the conductive support and the second end of the conductive pillar.

In this implementation, the first sealing piece is in an interference fit with the conductive support and the second end of the conductive pillar. In this way, the first sealing piece can play a greater role in sealing a gap between the groove of the conductive support and the second end of the conductive pillar to form sealing space, so that the sealing space can have a better sealing effect. This better avoids impact on conduction performance of the grounding ring that is caused when cooling water or cooling oil in the motor, an external impurity, or the like is attached to the grounding ring. Therefore, it is ensured that the grounding ring can maintain good conduction performance for a long time. In addition, in this implementation, the grounding ring is in an interference fit with the conductive support and the second end of the conductive pillar, so that a good connection effect can be achieved between the grounding ring and either of the conductive support and the conductive pillar, to ensure a good electrical connection effect between the grounding ring and either of the conductive support and the conductive pillar, so as to ensure that a shaft induced voltage can be sequentially transmitted through the conductive pillar, the grounding ring, and the conductive support to the housing smoothly.

In some implementations, the housing includes a housing body and an end cover that covers an opening of the housing body, a central axis of the end cover and a central axis of the rotating shaft are collinear or parallel, the end cover includes an inner surface facing the inside of the housing, an annular protrusion is disposed on the inner surface, an installation cavity is surrounded by the annular protrusion, an opening of the installation cavity faces the conductive pillar, the second end of the conductive pillar extends into the installation cavity, the first sealing piece seals the installation cavity to form the sealing space, and an outer ring surface of the grounding ring is in contact with an inner wall surface of the installation cavity.

In this implementation, the outer ring surface of the grounding ring is in contact with the inner wall surface of the installation cavity, that is, the grounding ring is electrically connected to the annular protrusion in this implementation. Because the annular protrusion is disposed on the end cover of the housing, the grounding ring can be electrically connected to the housing through the annular protrusion. Therefore, in this implementation, a transmission path of a shaft induced voltage on the rotating shaft is the rotating shaft, the conductive pillar, the grounding ring, the annular protrusion, and the housing in sequence. This avoids a case in which the shaft induced voltage transmitted on the rotating shaft is transmitted to the housing through a motor bearing, and avoids bearing electric corrosion of the motor bearing. In addition, in this implementation, an outer ring surface of the first sealing piece is in contact with the inner wall surface of the installation cavity, and an inner ring surface of the first sealing piece is in contact with the conductive pillar, so that the first sealing piece seals the installation cavity to form sealing space. The grounding ring is located on a side that is of the first sealing piece and that is away from the first end of the conductive pillar, so that the grounding ring is located in the sealing space. This avoids impact on conduction performance of the grounding ring that is caused when cooling water or cooling oil in the motor, an external impurity, or the like is attached to the grounding ring. Therefore, it is ensured that the grounding ring can maintain good conduction performance for a long time, so that the shaft induced voltage on the rotating shaft can be easily transmitted to the housing through the grounding ring, to avoid bearing electric corrosion caused when the shaft induced voltage is transmitted to the housing through the motor bearing, and prolong the service life of the motor bearing.

In addition, in this implementation, both the first sealing piece and the grounding ring are located in the installation cavity, and the installation cavity is surrounded by the annular protrusion disposed on the end cover. Therefore, when work such as installation, maintenance, or replacement needs to be performed on the first sealing piece and the grounding ring, only the end cover needs to be opened. In other words, subsequent work such as installation and maintenance of the motor can be convenient.

In some implementations, the first sealing piece is in an interference fit with the annular protrusion and the second end of the conductive pillar, and the grounding ring is in an interference fit with the annular protrusion and the second end of the conductive pillar.

In this implementation, the first sealing piece is in an interference fit with the annular protrusion and the second end of the conductive pillar. In this way, the first sealing piece can better seal a gap between a cavity wall of the installation cavity and the second end of the conductive pillar, so that the sealing space can have a better sealing effect. This better avoids impact on conduction performance of the grounding ring that is caused when cooling water or cooling oil in the motor, an external impurity, or the like is attached to the grounding ring. Therefore, it is ensured that the grounding ring can maintain good conduction performance for a long time. In addition, in this implementation, the grounding ring is in an interference fit with the annular protrusion and the second end of the conductive pillar, so that a good connection effect can be achieved between the grounding ring and either of the annular protrusion and the conductive pillar, to ensure a good electrical connection effect between the grounding ring and either of the annular protrusion and the conductive pillar, so as to ensure that a shaft induced voltage can be sequentially transmitted through the conductive pillar, the grounding ring, and the annular protrusion to the housing smoothly.

In some implementations, the first end of the conductive pillar is in an interference fit with the rotating shaft, so that the first end of the conductive pillar is fastened to the rotating shaft and electrically connected to the rotating shaft.

In this implementation, the first end of the conductive pillar is in an interference fit with the rotating shaft, so that the first end of the conductive pillar can be fastened to the rotating shaft and can rotate with the rotating shaft, and it can be ensured that the conductive pillar can be in close contact with the rotating shaft, so as to ensure an electrical connection effect between the conductive pillar and the rotating shaft. In addition, in this implementation, the first end of the conductive pillar is in an interference fit with the rotating shaft, and different areas of the axial cavity can be separated by using the conductive pillar, to prevent cooling water, cooling oil, or the like in the axial cavity from flowing into the sealing space through the opening of the axial cavity.

In some implementations, the motor further includes a second sealing piece, the second sealing piece cooperates with the first sealing piece to seal the part of space in the housing to form the sealing space, and the grounding ring is located in the sealing space.

In this implementation, the part of space in the housing is sealed by using the first sealing piece to obtain the sealing space, and the grounding ring is located in the sealing space. This can avoid impact on conduction performance of the grounding ring that is caused when cooling water or cooling oil in the motor, an external impurity, or the like is attached to the grounding ring. Therefore, it is ensured that the grounding ring can maintain good conduction performance for a long time, so that the shaft induced voltage on the rotating shaft can be easily transmitted to the housing through the grounding ring, to avoid bearing electric corrosion caused when the shaft induced voltage is transmitted to the housing through the motor bearing, and prolong the service life of the motor bearing.

In some implementations, the rotating shaft includes an axial cavity, the axial cavity includes a first opening, the second sealing piece is disposed in the axial cavity, the second sealing piece separates the axial cavity into a first area and a second area arranged in an axial direction, the first area is closer to the first opening than the second area, both the first sealing piece and the grounding ring are annular, and both the first sealing piece and the grounding ring are sleeved on the rotating shaft or accommodated in the axial cavity.

In this implementation, the second sealing piece separates the axial cavity into the first area and the second area arranged in the axial direction, that is, cooling water, cooling oil, or the like in the second area can be prevented, by using the second sealing piece, from flowing into the first area. In addition, through cooperation with the first sealing piece, the part of space in the housing can be sealed to form the sealing space. In this implementation, the grounding ring is sleeved on the rotating shaft or accommodated in the axial cavity, so that a shaft induced voltage transmitted on the rotating shaft can be transmitted to the grounding ring.

In some implementations, the motor further includes a transmission piece, the transmission piece is a conductive structure, the transmission piece includes a transmission pillar, the transmission pillar includes a first end and a second end that are opposite to each other, the first end of the transmission pillar extends into the axial cavity from the first opening, a central axis of the transmission pillar coincides with a central axis of the axial cavity, there is a gap between the transmission pillar and an inner wall of the axial cavity, and the second end of the transmission pillar is connected to the housing. Both the grounding ring and the first sealing piece are accommodated in the axial cavity and sleeved on the first end of the transmission pillar, an inner ring surface of the grounding ring is in contact with the transmission pillar, and an outer ring surface of the grounding ring is in contact with an inner wall surface of the axial cavity, an inner ring surface of the first sealing piece is in contact with the transmission pillar, and an outer ring surface of the first sealing piece is in contact with the inner wall surface of the axial cavity, so that the first sealing piece seals the gap between the transmission pillar and the axial cavity, and the first sealing piece and the second sealing piece seal a part that is of the axial cavity and that is between the first sealing piece and the second sealing piece to obtain the sealing space. The grounding ring is located on a side that is of the first sealing piece and that is opposite to the second end of the transmission pillar, so that the grounding ring is located in the sealing space between the first sealing piece and the second sealing piece.

In this implementation, the inner ring surface of the grounding ring is in contact with the transmission pillar, and the outer ring surface of the grounding ring is in contact with an inner wall surface of the axial cavity, so that a shaft induced voltage transmitted on the rotating shaft can be transmitted to the transmission pillar through the grounding ring. In addition, the second end of the transmission pillar is connected to the housing. To be specific, in this implementation, a transmission path of the shaft induced voltage is the rotating shaft, the grounding ring, the transmission pillar, and the housing in sequence. In this implementation, the first sealing piece seals the gap between the transmission pillar and the axial cavity, and the second sealing piece separates the first area and the second area of the axial cavity, so that the first sealing piece and the second sealing piece seal a part that is of the axial cavity and that is between the first sealing piece and the second sealing piece, to obtain the sealing space. The grounding ring is located on the side that is of the first sealing piece and that is opposite to the second end of the transmission pillar, so that the grounding ring is located in the sealing space between the first sealing piece and the second sealing piece. This avoids impact on conduction performance of the grounding ring that is caused when cooling water or cooling oil in the motor, an external impurity, or the like is attached to the grounding ring. Therefore, it is ensured that the grounding ring can maintain good conduction performance for a long time.

In some implementations, the first sealing piece is in an interference fit with the rotating shaft and the first end of the transmission pillar, and the grounding ring is in an interference fit with the rotating shaft and the second end of the transmission pillar.

In this implementation, the first sealing piece is in an interference fit with the rotating shaft and the first end of the transmission pillar, so that the first sealing piece can better seal the gap between the inner wall surface of the axial cavity of the rotating shaft and the first end of the transmission pillar, so as to ensure that the sealing space can have a better sealing effect. This better avoids impact on conduction performance of the grounding ring that is caused when cooling water or cooling oil in the motor, an external impurity, or the like is attached to the grounding ring. Therefore, it is ensured that the grounding ring can maintain good conduction performance for a long time. In addition, in this implementation, the grounding ring is in an interference fit with the rotating shaft and the second end of the transmission pillar, so that a good connection effect can be achieved between the grounding ring and either of the rotating shaft and the transmission pillar, to ensure a good electrical connection effect between the grounding ring and either of the rotating shaft and the second end of the transmission pillar, so as to ensure that a shaft induced voltage can be sequentially transmitted through the rotating shaft, the grounding ring, and the transmission pillar to the housing smoothly.

In some implementations, the transmission piece further includes a connection support, the housing includes a housing body and an end cover that covers an opening of the housing body, a central axis of the end cover and a central axis of the rotating shaft are collinear or parallel, one end of the connection support is directly connected to the second end of the transmission pillar, and the other end of the connection support is directly connected to the housing.

In this implementation, one end of the connection support is directly connected to the second end of the transmission pillar, and the other end of the connection support is directly connected to the housing. In other words, in this implementation, the transmission pillar is connected to the housing through the connection support, that is, the transmission pillar is indirectly connected to the housing in this implementation.

In some implementations, the housing includes a housing body and an end cover that covers an opening of the housing body, a central axis of the end cover and a central axis of the rotating shaft are collinear or parallel, the end cover includes an inner surface facing the inside of the housing, an annular protrusion is disposed on the inner surface, an installation cavity is surrounded by the annular protrusion, an opening of the installation cavity faces the rotating shaft, and one end of the rotating shaft extends into the installation cavity. Both the grounding ring and the first sealing piece are sleeved on the end that is of the rotating shaft and that extends into the installation cavity, inner ring surfaces of both the grounding ring and the first sealing piece are in contact with the rotating shaft, outer ring surfaces of both the grounding ring and the first sealing piece are in contact with an inner wall surface of the installation cavity, the first sealing piece and the second sealing piece cooperate to seal the first area and the installation cavity to form the sealing space, and the grounding ring is located on a side that is of the first sealing piece and that faces the end cover, so that the grounding ring is located in the sealing space.

In this implementation, the outer ring surface of the grounding ring is in contact with the inner wall surface of the installation cavity, that is, the grounding ring is electrically connected to the annular protrusion in this implementation. Because the annular protrusion is disposed on the end cover of the housing, the grounding ring can be electrically connected to the housing through the annular protrusion. Therefore, in this implementation, a transmission path of a shaft induced voltage on the rotating shaft is the rotating shaft, the grounding ring, the annular protrusion, and the housing in sequence. This avoids a case in which the shaft induced voltage transmitted on the rotating shaft is transmitted to the housing through a motor bearing, and avoids bearing electric corrosion of the motor bearing. In addition, in this implementation, an outer ring surface of the first sealing piece is in contact with the inner wall surface of the installation cavity, and an inner ring surface of the first sealing piece is in contact with the rotating shaft, so that the first sealing piece and the second sealing piece can seal the installation cavity and the first area to form sealing space. The grounding ring is located on the side that is of the first sealing piece and that faces the end cover, so that the grounding ring is located in the sealing space. This can avoid impact on conduction performance of the grounding ring that is caused when cooling water or cooling oil in the motor, an external impurity, or the like is attached to the grounding ring. Therefore, it is ensured that the grounding ring can maintain good conduction performance for a long time.

In addition, in this implementation, both the first sealing piece and the grounding ring are located in the installation cavity, and the installation cavity is surrounded by the annular protrusion disposed on the end cover. Therefore, when work such as installation, maintenance, or replacement needs to be performed on the first sealing piece and the grounding ring, only the end cover needs to be opened. In other words, subsequent work such as installation and maintenance of the motor can be convenient.

In some implementations, the first sealing piece is in an interference fit with both the annular protrusion and the rotating shaft, and the grounding ring is in an interference fit with both the annular protrusion and the rotating shaft.

In this implementation, the first sealing piece is in an interference fit with the annular protrusion and the rotating shaft. In this way, the first sealing piece can better seal a gap between a cavity wall of the installation cavity and the rotating shaft, so that the sealing space can have a better sealing effect. This better avoids impact on conduction performance of the grounding ring that is caused when cooling water or cooling oil in the motor, an external impurity, or the like is attached to the grounding ring. Therefore, it is ensured that the grounding ring can maintain good conduction performance for a long time. In addition, in this implementation, the grounding ring is in an interference fit with both the annular protrusion and the rotating shaft, so that a good connection effect can be achieved between the grounding ring and either of the annular protrusion and the rotating shaft, to ensure a good electrical connection effect between the grounding ring and either of the annular protrusion and the rotating shaft, so as to ensure that a shaft induced voltage can be sequentially transmitted through the rotating shaft, the grounding ring, and the annular protrusion to the housing smoothly.

In some implementations, a radial dimension of the first area is greater than a radial dimension of the second area, a step structure is formed at a position at which an inner wall surface of the first area is connected to an inner wall surface of the second area, and the second sealing piece is disposed against the step structure. This ensures that the second sealing piece is more stably fastened in the axial cavity.

In some implementations, the grounding ring includes a conductive ring and a conductive fiber ring connected to the conductive ring, the conductive fiber ring is an annular structure formed by fastening a plurality of conductive fibers on the conductive ring, the conductive ring includes an inner ring surface and an outer ring surface that are opposite to each other, and the conductive fiber ring is connected to the inner ring surface or the outer ring surface of the conductive ring.

In this implementation, the conductive fiber ring is formed by fastening the plurality of conductive fibers on the conductive ring. To be specific, the conductive fiber ring is a flexible structure, and can be in flexible contact with a contact surface. This avoids impact of the grounding ring on rotation of the rotating shaft.

In some implementations, there are a plurality of grounding rings, the plurality of grounding rings is disposed coaxially, the plurality of grounding rings is all located in the sealing space, and each grounding ring is electrically connected to the rotating shaft and the housing. This ensures a better electrical connection effect between the rotating shaft and the housing. In addition, because there is the plurality of grounding rings, when one of the grounding rings is damaged, another grounding ring can continue to function as an electrical connection. This further prolongs a protection function of the grounding ring on a conductive bearing, so that the conductive bearing can be effectively prevented from bearing electric corrosion for a long time. In the implementations of this disclosure, the plurality of grounding rings is all located in the sealing space. This avoids impact on conduction performance of the grounding ring that is caused due to scouring or soaking of cooling water or cooling oil on the grounding ring, so as to ensure that the grounding ring can have a relatively long service life and can always have good conduction performance. In this way, the shaft induced voltage on the rotating shaft can be well transmitted to the housing through the grounding ring in a long time period, so as to ensure, in a long time period, that the motor bearing does not encounter bearing electric corrosion, thereby ensuring a service life of the motor bearing.

According to a second aspect, this disclosure further provides a power assembly. The power assembly includes a motor controller and a motor, and the motor controller is electrically connected to the motor, to control the motor to work.

According to a third aspect, this disclosure further provides a motor drive device. The motor drive device includes an installation support and a power assembly, and the power assembly is installed on the installation support.

In some implementations, the motor drive device is an electric vehicle, the installation support is a vehicle frame, and the power assembly is installed on the vehicle frame.

BRIEF DESCRIPTION OF DRAWINGS

To describe structural features and functions of this disclosure more clearly, the following describes this disclosure in detail with reference to accompanying drawings and specific embodiments.

DESCRIPTION OF EMBODIMENTS

The following describes the technical solutions in embodiments of this disclosure with reference to accompanying drawings in embodiments of this disclosure.

This disclosure provides a motor drive device. The motor drive device includes an installation support and a power assembly, and the power assembly is installed on the installation support, to provide kinetic energy for the motor drive device by using the power assembly, so that a motor drives the motor drive device to work. In this disclosure, the motor drive device may be a device such as an electric vehicle or a wind turbine. In this disclosure, the motor drive device in this disclosure is described by using an example in which the motor drive device is an electric vehicle.

Figure 1:
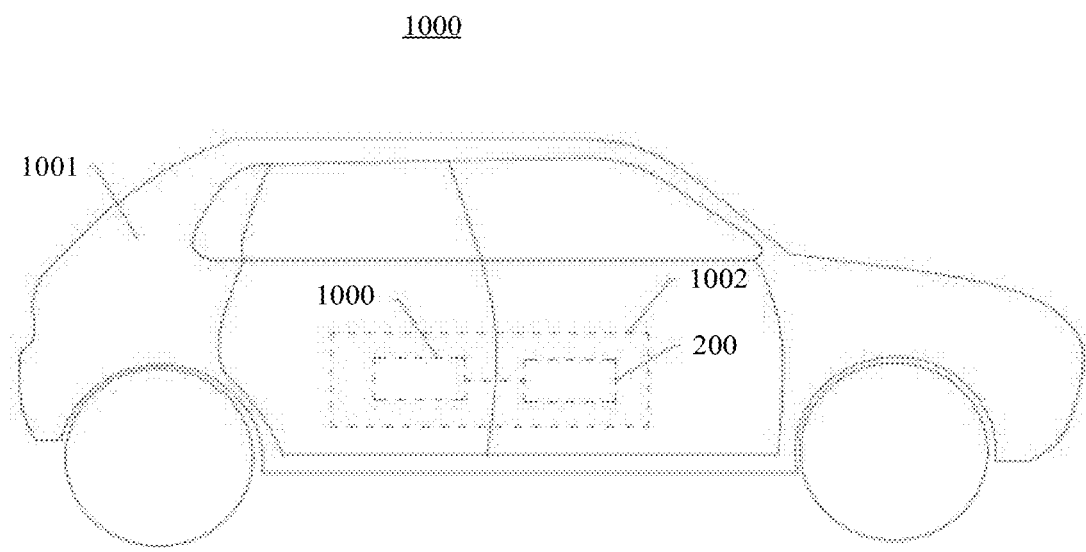
FIG. 1 is a schematic diagram of a structure of a motor drive device according to an implementation of this disclosure.

FIG. 1 is a schematic diagram of a structure of a motor drive device 1000 according to an implementation of this disclosure. The motor drive device 1000 includes an installation support 1001 and a power assembly 1002, and the power assembly 1002 is installed on the installation support 1001. In this implementation, the motor drive device 1000 is an electric vehicle, the installation support 1001 is a vehicle frame of the electric vehicle, and the power assembly 1002 is installed on the vehicle frame. As a structural framework of the electric vehicle, the vehicle frame is configured to support, fasten, and connect assemblies of the electric vehicle, and withstand load inside a vehicle system and load from an external environment. The power assembly 1002 is a power structure that includes a series of components and that is configured to generate power and transmit power to a road system to enable the vehicle to travel.

In this implementation, the power assembly 1002 may include a motor 100 and a motor controller 200. The motor controller 200 is electrically connected to the motor 200, and is configured to control the motor 100 to work. The motor 100 works to convert electric energy into kinetic energy, to drive wheels of the electric vehicle to rotate, so that the electric vehicle can travel.

Figure 2:
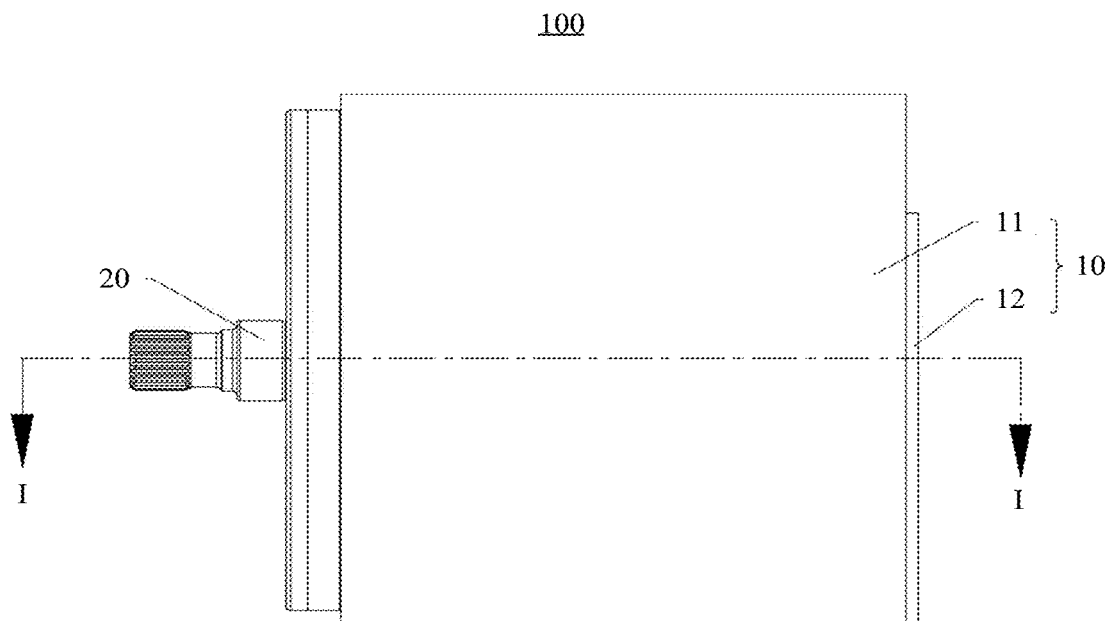
FIG. 2 is a schematic diagram of a structure of a motor according to an implementation of this disclosure.
Figure 3:
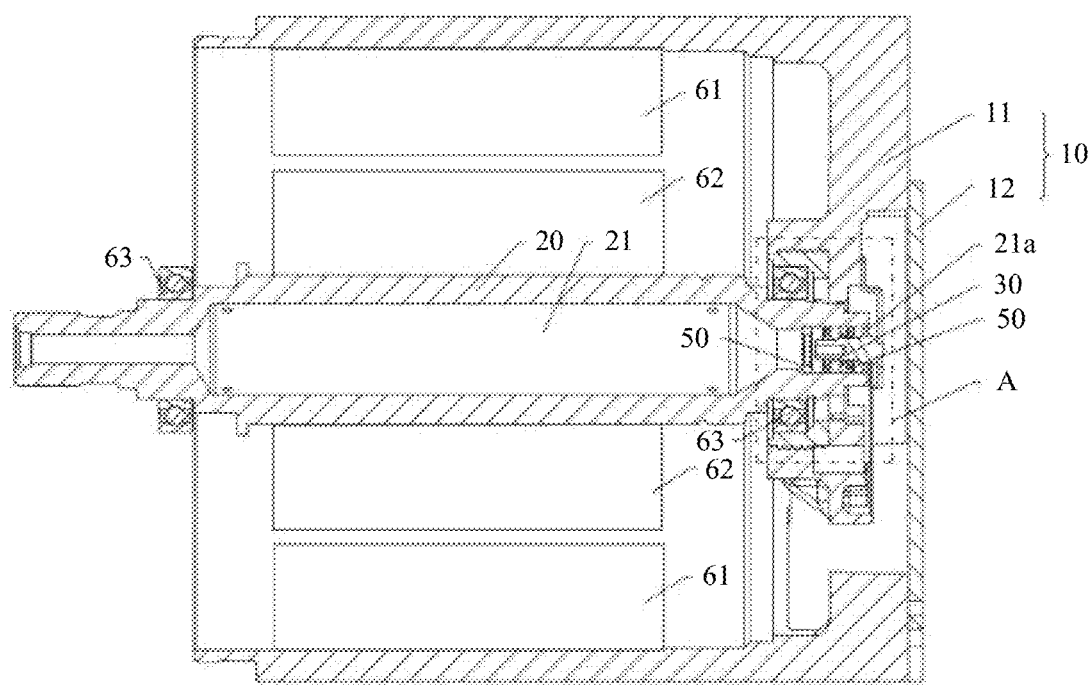
FIG. 3 is a schematic diagram of a partial cross-section obtained by sectioning the motor shown in FIG. 2 along I-I.

FIG. 2 is a schematic diagram of a structure of a motor 100 according to an implementation of this disclosure. FIG. 3 is a schematic diagram of a partial cross-section obtained by sectioning the motor 100 shown in FIG. 2 along I-I. In this implementation, the motor 100 includes a housing 10, a rotating shaft 20, a grounding ring 30, a first sealing piece 40, a second sealing piece 50, a stator 61, a rotor 62, and a motor bearing 63. The rotating shaft 20, the grounding ring 30, the stator 61, and the rotor 62 are all accommodated in the housing 10, to protect components such as the rotating shaft 20 and the grounding ring inside the housing 10 by using the housing 10. In some implementations of this disclosure, the housing 10 is grounded, and the rotating shaft 20 can be electrically connected to the housing 10, so that a shaft induced voltage generated on the rotating shaft 20 during working of the motor 100 is transmitted to the housing and is transmitted to the ground through the housing 10, thereby avoiding impact on a life of the motor 100 that is caused by a charge generated by the motor 100 during working, ensuring safety of the motor 100, and avoiding a danger caused by charge aggregation and discharging. In some implementations of this disclosure, the housing 10 is made of a metal material, to ensure that the housing 10 can have a relatively high strength, implement a good protection and support effect, and have a good conduction function, so as to transmit, to the ground, the shaft induced voltage transmitted on the rotating shaft 20.

In this implementation, the stator 61 is fastened to the housing 10, and the rotor 62 is opposite to the stator 61 with a gap. The stator 61 is connected to the motor controller 200. The motor controller 200 inputs a current-change motor control signal to the stator 61. The rotor 62 rotates in response to the motor control signal that passes through the stator 61, and rotation of the rotor 62 drives the rotating shaft 20 fixedly connected to the rotor 62 to rotate. The rotating shaft 20 rotates to output the kinetic energy generated by the motor 100 and transmit the kinetic energy generated by the motor 100 to a road surface by using another structure connected to the rotating shaft 20, so as to drive the vehicle to travel.

In this implementation, the motor 100 includes at least two motor bearings 63, and the two motor bearings 63 are separately sleeved on two ends of the rotating shaft 20 to support the rotating shaft 20, so as to ensure stable installation of the rotating shaft 20 in the housing 10. In an implementation of this disclosure, the motor bearing 63 includes an inner ring and an outer ring that are disposed coaxially, and the inner ring is surrounded by the outer ring. The outer ring of the motor bearing 63 is fastened to the housing 10, and the inner ring of the motor bearing 63 is fastened to the rotating shaft 20, to implement position fastening between the rotating shaft 20 and the housing 10, so as to ensure stable installation of the rotating shaft 20 in the motor 100. In addition, there is a gap between the inner ring and the outer ring of the motor bearing 63, and a rolling piece is disposed in the gap between the inner ring and the outer ring. In this way, the inner ring and the outer ring of the motor bearing 63 can rotate relative to each other by using a central axis of the inner ring and the outer ring as a rotation axis, so that the rotating shaft 20 can rotate relative to the housing 10 to output power.

In some implementations of this disclosure, the housing 10 of the motor 100 includes a housing body 11 and an end cover 12 that covers an opening of the housing body 11. In this implementation, the end cover 12 detachably covers the housing body 11. This can facilitate installation, subsequent maintenance, and the like of components such as the rotating shaft 20, the grounding ring 30, the first sealing piece 40, the second sealing piece 50, the rotor 62, and the stator 61 that are disposed in the housing 10. In this implementation, the end cover 12 covers the housing body 11 in an axial direction of the housing body 11, and the axial direction of the housing body 11 is the same as an axial direction of the rotating shaft 20, and is an X-axis direction in the figure. In this implementation, both the end cover 12 and the housing body 11 are made of conductive materials, both the end cover 12 and the housing body 11 are grounded, and a charge can be transmitted to the ground through each of the end cover 12 and the housing body 11.

Figure 4:
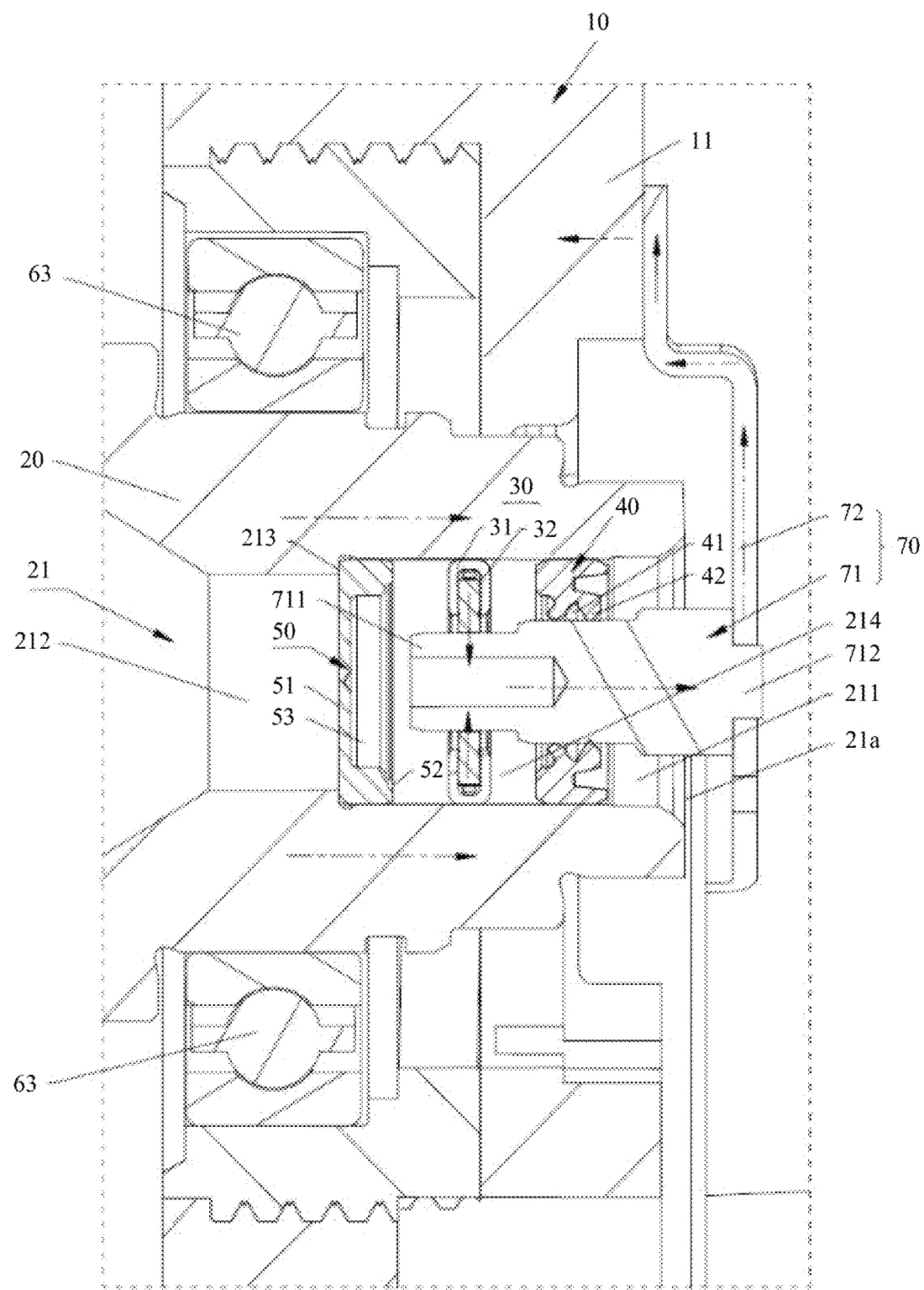
FIG. 4 is an enlarged schematic diagram of a position A in FIG. 3.
Figure 5:
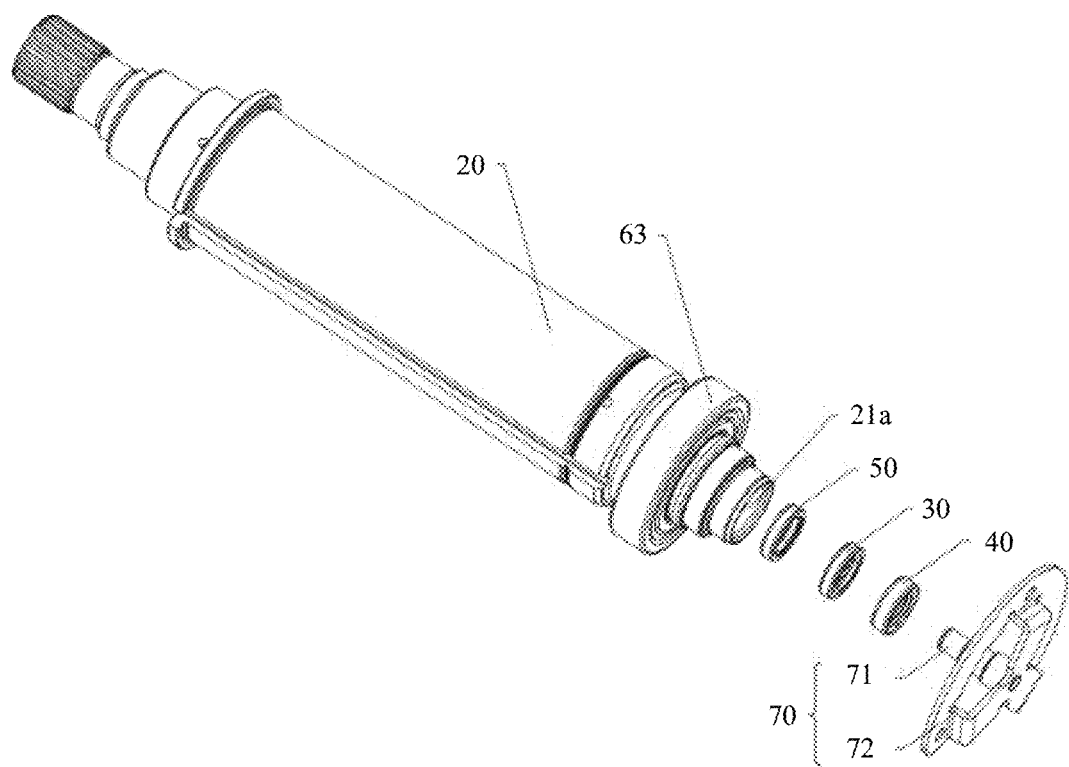
FIG. 5 is a schematic diagram of an exploded structure of a partial structure in FIG. 4.

FIG. 4 is an enlarged schematic diagram of a position A in FIG. 3, and FIG. 5 is a schematic diagram of an exploded structure of a partial structure in FIG. 4. In an implementation of this disclosure, the rotating shaft 20 is hollow and tubular, and includes an axial cavity 21 that extends in the axial direction, so that a weight of the motor 100 can be reduced. In some implementations, the axial cavity 21 of the rotating shaft 20 may also be used as a cooling water pipe or a cooling oil pipe, and cooling water or cooling oil can flow in the axial cavity 21 of the rotating shaft 20, so as to bring out heat generated when the rotor and the rotating shaft 20 rotate. In this implementation, a central axis of the axial cavity 21 coincides with a central axis of the rotating shaft 20. In this implementation, the axial cavity 21 includes a first opening 21a. The axial cavity 21 includes a first area 211 and a second area 212 arranged in the axial direction, and the first area 211 is closer to the first opening 21a than the second area 212. A radial dimension of the first area 211 is greater than a radial dimension of the second area 212, and an inner wall surface of the first area 211 is connected to an inner wall surface of the second area 212 through a connection surface 213, so that a step structure is formed at a position at which the inner wall surface of the first area 211 is connected to the inner wall surface of the second area 212.

In an implementation of this disclosure, the grounding ring 30 is a conductive structure, that is, the grounding ring 30 in this disclosure is conductive. In this disclosure, the grounding ring 30 can be electrically connected to the rotating shaft 20 and the housing 10, to transmit a shaft induced voltage generated on the rotating shaft 20 to the housing 10, and then transmit the shaft induced voltage to the ground through the housing 10, so as to avoid bearing electric corrosion caused when the shaft induced voltage is transmitted through the motor bearing 63.

Figure 6:
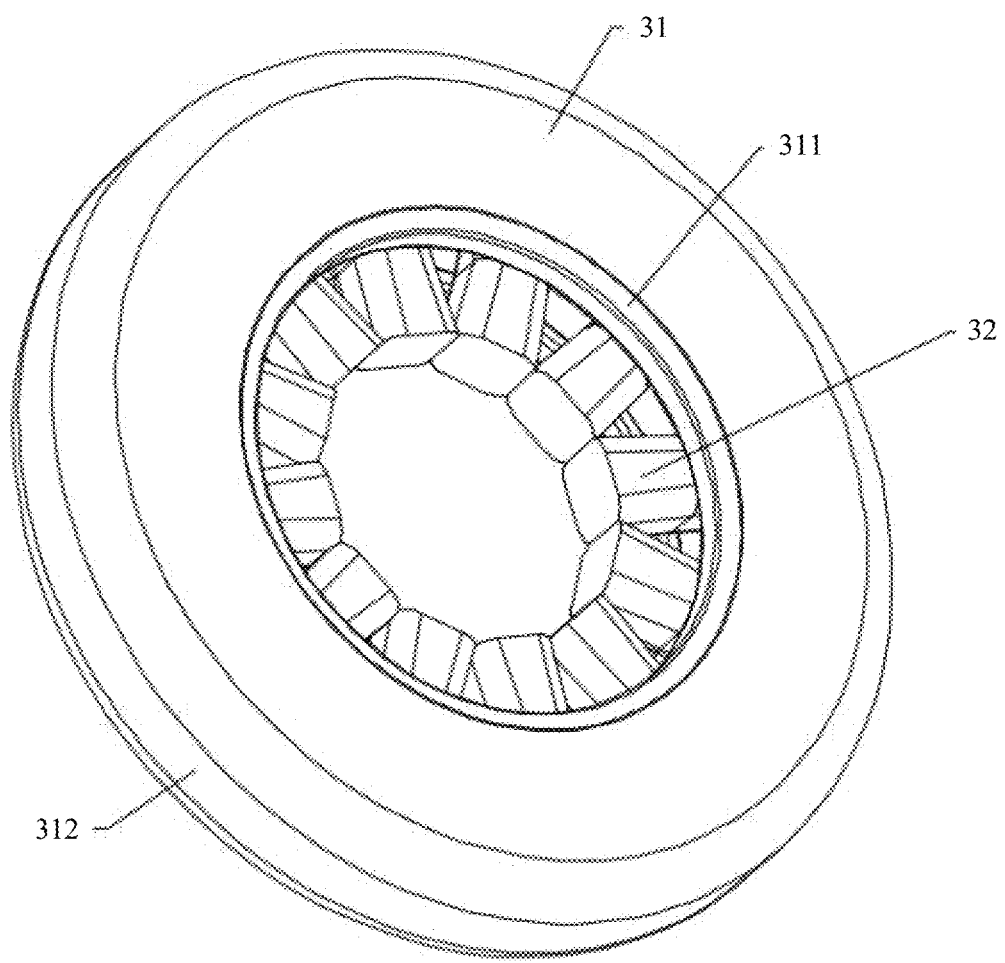
FIG. 6 is a schematic diagram of a structure of a grounding ring according to an implementation of this disclosure.
Figure 7:
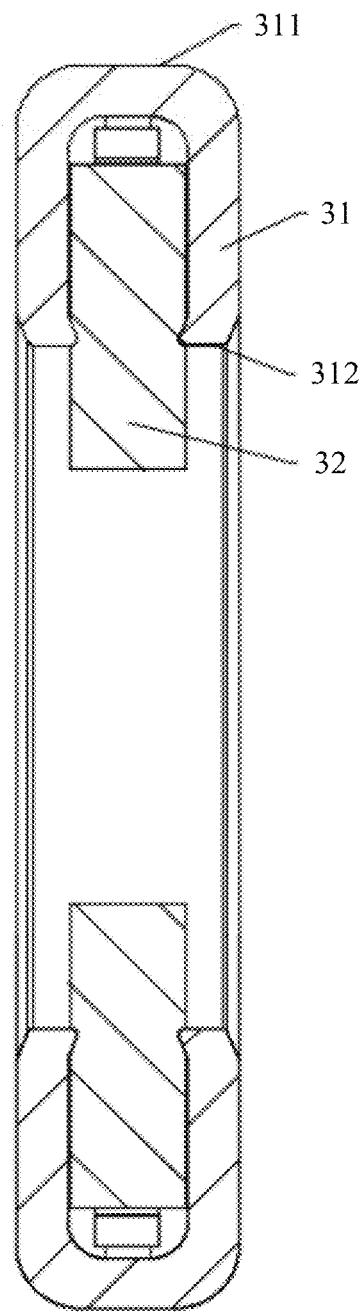
FIG. 7 is a schematic cross-sectional diagram of the grounding ring shown in FIG. 6.
Figure 8:
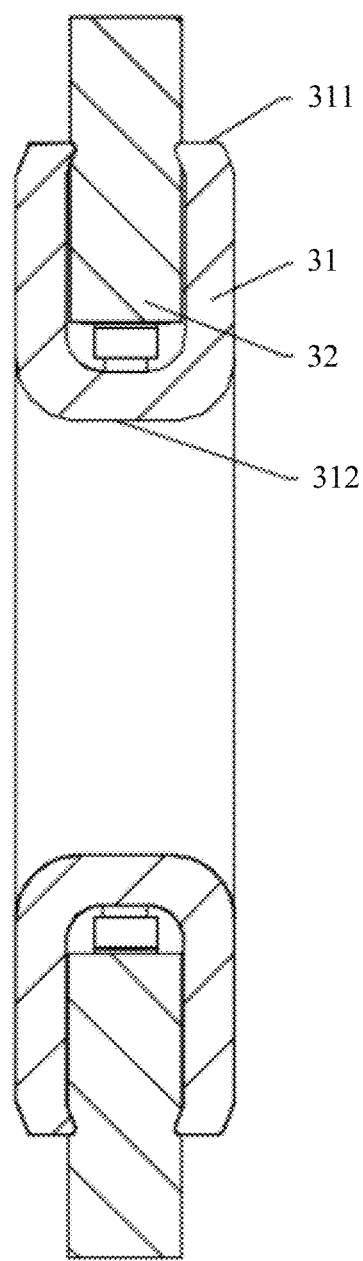
FIG. 8 is a schematic cross-sectional diagram of a grounding ring according to another implementation of this disclosure.

FIG. 6 is a schematic diagram of a structure of a grounding ring 30 according to an implementation of this disclosure, and FIG. 7 is a schematic cross-sectional diagram of the grounding ring 30 shown in FIG. 6. In this implementation, the grounding ring 30 includes a conductive ring 31 and a conductive fiber ring 32 connected to the conductive ring 31. In this implementation, the conductive ring 31 is a ring structure made of a metal material, and the conductive fiber ring 32 is a ring structure formed by fastening a plurality of conductive fibers on the conductive ring 31. The conductive ring 31 includes an inner ring surface 311 and an outer ring surface 312 that are opposite to each other, and the outer ring surface 312 surrounds the inner ring surface 311. In this implementation, the conductive fiber ring 32 is fastened to the inner ring surface 311 of the conductive ring 31. It may be understood that, in another implementation of this disclosure, the conductive fiber ring 32 may alternatively be fastened to the outer ring surface 312 of the conductive ring 31. For example, FIG. 8 is a schematic cross-sectional diagram of a grounding ring 30 according to another implementation of this disclosure. In this implementation, the conductive fiber ring 32 is fastened to the outer ring surface 312 of the conductive ring 31.

In this disclosure, the conductive ring 31 is made of a metal material, the conductive fiber ring 32 is made of a carbon fiber, and both the metal material and the carbon fiber material have good conductivity. In this way, a resistance of the grounding ring 30 can be less than a resistance of the motor bearing 63, so that the shaft induced voltage transmitted on the rotating shaft 20 can be transmitted through the grounding ring 30. This avoids impact on use performance of the motor 100 that is caused by bearing electric corrosion of the motor bearing 63. In addition, the conductive fiber ring 32 has a simpler structure, lower manufacturing costs, and a lighter weight than a conductive bearing. Therefore, a manufacturing process of the motor 100 can be simplified, production costs of the motor 100 can be reduced, and a weight of the motor 100 can be reduced. It may be understood that, in some other implementations of this disclosure, the conductive ring 31 and the conductive fiber ring 32 of the grounding ring 30 each may alternatively be made of another material having a good conductive effect, and a material for making the grounding ring 30 is not specifically limited in this disclosure.

Referring to FIG. 4 again, in the implementation shown in FIG. 4, the motor 100 further includes a transmission piece 70. The transmission piece 70 is a conductive structure, and is conductive. In this implementation, the transmission piece 70 is made of a metal material with good conduction performance. The transmission piece 70 is in contact with the housing 10 and the grounding ring 30, to transmit, to the housing 10 through the transmission piece 70, the shaft induced voltage transmitted by the rotating shaft 20 to the grounding ring 30.

In this implementation, the transmission piece 70 includes a transmission pillar 71 and a connection support 72, and the connection support 72 connects the transmission pillar 71 and the housing 10. Specifically, in this implementation, the transmission pillar 71 is a columnar structure, and includes a first end 711 and a second end 712 that are disposed opposite to each other. The connection support 72 connects the second end 712 of the transmission pillar 71 and the housing body 11 of the housing 10, so that a charge transmitted to the transmission pillar 71 is transmitted to the housing 10 through the connection support 72, and the transmission pillar 71 can be stably fastened in the housing 10 by using the connection support 72. It may be understood that, in some other implementations of this disclosure, the transmission piece 70 may alternatively include only the transmission pillar 71, and the second end 712 of the transmission pillar 71 is directly connected to the housing 10, so that the charge transmitted to the transmission pillar 71 can be directly transmitted to the housing 10.

In this implementation, the connection support 72 is a plurality of metal strips, one end of the metal strip is fixedly connected to the second end 712 of the transmission pillar 71, and the other end of the metal strip is fixedly connected to the housing 10. This can reduce occupied space as much as possible, implement a good effect of electrically connecting the transmission pillar 71 and the housing 10, and stably fasten the transmission pillar 71 and the housing 10. It may be understood that, in an implementation of this disclosure, the connection support 72 may alternatively be another structure. For example, the connection support 72 may be a disk structure, a disk center is fastened to the transmission pillar 71, and a disk edge is fixedly connected to the housing 10. A specific structure of the connection support 72 is not limited in this disclosure.

In this implementation, when the first end 711 of the transmission pillar 71 extends into the axial cavity 21 through the first opening 21a of the axial cavity 21, and the first end 711 of the transmission pillar 71 extends into the axial cavity 21, there is a gap between the transmission pillar 71 and an inner wall of the axial cavity 21. In addition, when the first end 711 of the transmission pillar 71 extends into the axial cavity 21, a central axis of the transmission pillar 71 coincides with a central axis of the axial cavity 21.

In this implementation, the grounding ring 30, the first sealing piece 40, and the second sealing piece 50 are all accommodated in the axial cavity 21. Specifically, in this implementation, the grounding ring 30, the first sealing piece 40, and the second sealing piece 50 are all accommodated in the first area 211 of the axial cavity 21.

In this implementation, the second sealing piece 50 is a disk-shaped oil plug, and includes a first surface 51 and a second surface 52 that are disposed opposite to each other, and the second surface 52 faces the end cover 12 of the housing 10. In this implementation, the second sealing piece 50 is disposed in the axial cavity 21, to separate the first area 211 of the axial cavity 21 from the second area 212, so as to avoid a case in which cooling water or cooling oil flowing in the second area 212 flows into the first area 211. The second sealing piece 50 is disposed against the step structure in the axial cavity 21, that is, the first surface 51 of the second sealing piece 50 is disposed against the connection surface 213 of the step structure, so that a position of the second sealing piece 50 in the axial cavity 21 is more stable.

In this implementation, the second sealing piece 50 is in an interference fit with the rotating shaft 20, that is, a radial dimension of the second sealing piece 50 is slightly greater than a radial dimension of the axial cavity 21 at a position of the first sealing piece 40, to ensure that the second sealing piece 50 can be more stably installed in the axial cavity 21, and ensure that the first sealing piece 40 can tightly fit an inner surface of the axial cavity 21, so as to ensure that the second sealing piece 50 can separate the first area 211 in the axial cavity 21 from the second area 212, and avoid a case in which cooling water or cooling oil flowing in the second area 212 flows into the first area 211. In this implementation, the first sealing piece 40 is located on a side that is of the transmission pillar 71 and that is away from the end cover 12.

In some implementations of this disclosure, the second sealing piece 50 is made of a plastic material. A groove 53 is recessed on the first surface 51 or the second surface 52 of the second sealing piece 50, so that the second sealing piece 50 can have better deformation performance, and therefore can be installed into the axial cavity 21 more easily. In some implementations, the groove 53 of the second sealing piece 50 faces the end cover 12, to avoid a case in which cooling oil or cooling water flowing in the axial cavity 21 gathers in the groove 53, so as to ensure cleaning of the second sealing piece 50.

In this implementation, the first sealing piece 40 is an annular oil seal. Both the grounding ring 30 and the first sealing piece 40 are sleeved on the transmission pillar 71. In this implementation, both an inner ring surface of the grounding ring 30 and an inner ring surface of the first sealing piece 40 are in contact with the transmission pillar 71. In addition, an outer ring surface of the grounding ring 30 is in contact with an inner wall surface of the axial cavity 21, so that the grounding ring 30 can be electrically connected to the rotating shaft 20 and the transmission pillar 71. The shaft induced voltage transmitted on the rotating shaft 20 is transmitted to the transmission pillar 71 through the grounding ring 30, and then is transmitted to the housing 10 through the connection support 72. In this implementation, the inner ring surface of the first sealing piece 40 is in contact with the transmission pillar 71, and an outer ring surface of the first sealing piece 40 is in contact with the inner wall surface of the axial cavity 21, so that the first sealing piece 40 seals a gap between the transmission pillar 71 and the axial cavity 21. In this way, the first sealing piece 40 and the second sealing piece 50 can seal a part that is of the axial cavity 21 and that is between the first sealing piece 40 and the second sealing piece 50 to obtain the sealing space 214, and liquid such as cooling water or cooling oil filled in the motor 100 and some impurities that are outside the motor 100 or generated during working of the motor 100 are not prone to enter the sealing space 214.

In this implementation, the grounding ring 30 is sleeved on the transmission pillar 71, and is located on a side that is of the first sealing piece 40 and that faces the second sealing piece 50. In other words, the grounding ring 30 is located in the sealing space 214 formed through sealing by the first sealing piece 40 and the second sealing piece 50. This avoids contact between the cooling water or the cooling oil in the motor 100 and the grounding ring 30, and then avoids impact on conduction performance of the grounding ring 30 that is caused due to scouring or soaking of the cooling water or the cooling oil on the grounding ring 30. In this way, it is ensured that the grounding ring 30 can always have good conduction performance, so that the shaft induced voltage on the rotating shaft 20 can be transmitted to the housing 10 through the grounding ring 30, to avoid bearing electric corrosion of the motor bearing 63 and ensure a life of the motor bearing 63. In addition, compared with that in a solution in which an insulating bearing or the like is used to electrically connect the rotating shaft 20 and the housing 10 to transmit the shaft induced voltage on the rotating shaft 20 to the housing 10, the grounding ring 30 in this disclosure has lower costs and is easier to manufacture, so that the motor 100 in this disclosure has lower manufacturing costs and is easier to manufacture. In this implementation, a transmission direction of the shaft induced voltage generated on the rotating shaft 20 is a direction shown by an arrow in FIG. 4. The shaft induced voltage on the rotating shaft 20 is transmitted to the grounding ring 30 through the rotating shaft 20, then is transmitted to the transmission piece 70 through the grounding ring 30, and finally is transmitted to the housing 10 through the transmission piece 70 and transmitted to the ground through the housing 10.

In some implementations of this disclosure, the first sealing piece 40 is in an interference fit with both the rotating shaft 20 and the transmission pillar 71, to ensure that the first sealing piece 40 can better seal a gap between the transmission pillar 71 and an inner wall of the rotating shaft 20, so that the first sealing piece 40 and the second sealing piece 50 seal a partial area that is of the axial cavity 21 and that is between the first sealing piece 40 and the second sealing piece 50 to form the sealing space 214. That the first sealing piece 40 is in an interference fit with the rotating shaft 20 means that an outer diameter of the first sealing piece 40 is slightly greater than an inner diameter at a position of the first sealing piece 40 in the axial cavity 21. When the first sealing piece 40 is disposed in the axial cavity 21, the first sealing piece 40 can be stably fastened in the axial cavity 21, and it can be ensured that there is no gap between an outer diameter surface of the first sealing piece 40 and an inner wall of the axial cavity 21, and that the first sealing piece 40 has a good sealing effect. That the first sealing piece 40 is in an interference fit with the transmission pillar 71 means that an inner diameter of the first sealing piece 40 is slightly less than a radial dimension at a position of the first sealing piece 40 on the transmission pillar 71. When the first sealing piece 40 is sleeved on the transmission pillar 71, there is no gap between an inner diameter surface of the first sealing piece 40 and the transmission pillar 71. This ensures that the first sealing piece 40 can better seal a gap between the transmission pillar 71 and the inner wall of the axial cavity 21.

In some implementations of this disclosure, at least one groove 41 is annularly disposed on the inner ring surface of the first sealing piece 40, and an annular convex strip 42 is formed between adjacent grooves 41. When the first sealing piece 40 is sleeved on the transmission pillar 71, the annular convex strip 42 between the grooves 41 is in contact with the transmission pillar 71. Because the annular convex strip 42 is relatively thin, and is relatively easy to deform, when the rotating shaft 20 rotates to drive the first sealing piece 40 to rotate relative to the transmission pillar 71, a relative rotation resistance between the first sealing piece 40 and the transmission pillar 71 is relatively small. In addition, when the rotating shaft 20 generates axial vibration, because the annular convex strip 42 can be easy to deform, specific axial movement between the rotating shaft 20 and the transmission pillar 71 is allowed, so that the rotating shaft 20 can move smoothly, damage caused by stress of relative movement between the rotating shaft 20 and the transmission pillar 71 can be avoided, and the life of the first sealing piece 40 can be ensured.

In this implementation, the conductive fiber ring 32 of the grounding ring 30 is fastened to an inner surface of the conductive ring 31. When the grounding ring 30 is sleeved on the transmission pillar 71, the grounding ring 30 is in an interference fit with both the transmission pillar 71 and the rotating shaft 20. In other words, an outer diameter of the conductive ring 31 of the grounding ring 30 in this implementation is greater than a radial dimension at a position of the grounding ring 30 in the axial cavity 21. When the grounding ring 30 is disposed in the axial cavity 21, the grounding ring 30 can be stably fastened in the axial cavity 21, and can move together with the rotating shaft 20. In addition, when the grounding ring 30 is in an interference fit with the rotating shaft 20, there can be a good contact effect between the grounding ring 30 and the rotating shaft 20. Therefore, the shaft induced voltage on the rotating shaft 20 can be transmitted to the grounding ring 30 more easily. That the grounding ring 30 is in an interference fit with the transmission pillar 71 means that an inner diameter of the conductive fiber ring 32 of the grounding ring 30 is slightly less than a radial dimension at a position of the grounding ring 30 on the transmission pillar 71. Therefore, when the grounding ring 30 is sleeved on the transmission pillar 71, there can be good contact between the transmission pillar 71 and the conductive fiber ring 32, that is, there is a good electrical connection effect between the grounding ring 30 and the transmission pillar 71. Therefore, the shaft induced voltage transmitted on the grounding ring 30 can be transmitted to the transmission pillar 71 more easily, and then transmitted to the housing body 11 through the transmission pillar 71 and the connection support 72. In this way, the shaft induced voltage on the rotating shaft 20 is transmitted to the housing body 11, and the motor bearing 63 is protected.

In addition, in this implementation, the conductive fiber ring 32 is an annular structure formed by fastening a plurality of conductive fibers on the inner ring surface 311 of the conductive ring 31. Because the conductive fiber has good flexibility, the conductive fiber ring 32 can be in flexible contact with the transmission pillar 71 when the grounding ring 30 is sleeved on the transmission pillar 71.

This ensures that the conductive fiber ring 32 and the transmission pillar 71 always have a good contact effect. In addition, when the rotating shaft 20 drives the transmission pillar 71 to rotate or move axially, the conductive fiber ring 32 of the grounding ring 30 can rotate relatively or move axially with the transmission pillar 71. This avoids a case in which when the rotating shaft 20 drives the transmission pillar 71 to rotate or move axially, movement of the rotating shaft 20 is affected because there is a relatively large movement resistance between the grounding ring 30 and the transmission pillar 71. In addition, damage of the grounding ring 30 can be reduced, and a service life of the grounding ring 30 can be prolonged.

Figure 9:
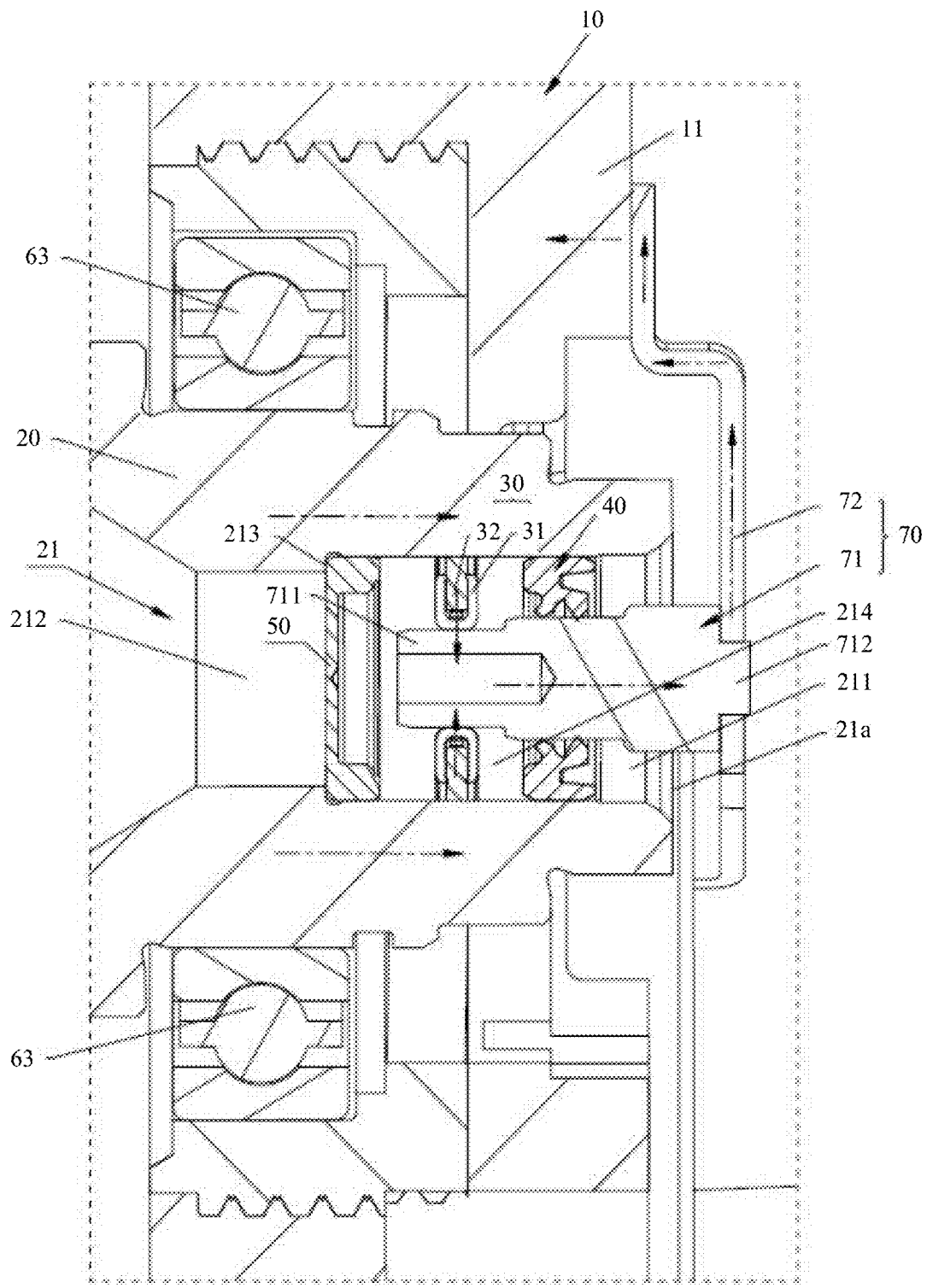
FIG. 9 is a schematic cross-sectional diagram of a motor according to another implementation of this disclosure.

It may be understood that, in some other implementations of this disclosure, the conductive fiber ring 32 of the grounding ring 30 may be fastened to an outer surface of the conductive ring 31. FIG. 9 is a schematic cross-sectional diagram of a motor 100 according to another implementation of this disclosure. A structure of the motor 100 in this implementation is basically the same as that in the implementation shown in FIG. 4. A difference lies in that in this implementation, the conductive fiber ring 32 of the grounding ring 30 is fastened to the outer surface of the conductive ring 31.

In this implementation, when the grounding ring 30 is sleeved on the transmission pillar 71, an inner ring surface 312 of the conductive ring 31 of the grounding ring 30 is in contact with the transmission pillar 71, and an outer ring surface of the conductive fiber ring 32 is in contact with the inner wall of the axial cavity 21, so that the shaft induced voltage on the rotating shaft 20 can be transmitted to the transmission pillar 71 through the grounding ring 30, and then transmitted to the housing body 11 through the transmission pillar 71 and the connection support 72. In this way, the shaft induced voltage on the rotating shaft 20 is transmitted to the housing body 11, and the motor bearing 63 is protected.

Similarly, in this implementation, the grounding ring 30 is in an interference fit with both the rotating shaft 20 and the transmission pillar 71. In this implementation, that the grounding ring 30 is in an interference fit with the transmission pillar 71 means that a radial dimension of the inner ring surface 312 of the conductive ring 31 of the grounding ring 30 is slightly less than a radial dimension at a position of the grounding ring 30 on the transmission pillar 71. Therefore, when the grounding ring 30 is sleeved on the transmission pillar 71, the grounding ring 30 can be stably fastened to the transmission pillar 71. That the grounding ring 30 is in an interference fit with the rotating shaft 20 means that a radial dimension of the outer ring surface of the conductive fiber ring 32 of the grounding ring 30 is slightly greater than a radial dimension at a position of the grounding ring 30 in the axial cavity 21 of the rotating shaft 20. Therefore, when the grounding ring 30 is disposed in the axial cavity 21, there can be good contact between the inner wall of the axial cavity 21 and the conductive fiber ring 32, so that a good electrical transmission effect can be ensured between the conductive fiber ring 32 of the grounding ring 30 and the rotating shaft 20. In addition, the conductive fiber ring 32 is formed by fastening a plurality of conductive fibers on the conductive ring 31, and has good flexibility. Therefore, when the grounding ring 30 is accommodated in the axial cavity 21, and the grounding ring 30 is in an interference fit with the axial cavity 21, if the rotating shaft 20 rotates, the grounding ring 30 can rotate relative to the rotating shaft 20, and the conductive fiber ring 32 of the grounding ring 30 can move on the inner surface of the axial cavity 21, so that a good contact effect is always ensured between the conductive fiber ring 32 and the rotating shaft 20. In addition, when the rotating shaft 20 rotates or moves axially, the conductive fiber ring 32 of the grounding ring 30 can rotate relatively or move axially with the rotating shaft 20. This avoids a case in which when the rotating shaft 20 rotates or moves axially, movement of the rotating shaft 20 is affected because there is a relatively large movement resistance between the grounding ring 30 and the rotating shaft 20. In addition, damage of the grounding ring 30 can be reduced, and a service life of the grounding ring 30 can be prolonged.

For the motor 100 in the implementation shown in FIG. 3 that is compared with the motor 100 in the implementation shown in FIG. 9, the conductive fiber ring 32 of the grounding ring 30 of the motor 100 in the implementation shown in FIG. 3 is fastened to the inner surface of the conductive ring 31, and the inner diameter of the conductive fiber ring 32 is slightly less than the outer diameter of the transmission pillar 71. When the rotating shaft 20 rotates, a linear speed of movement of the conductive fiber ring 32 shown in FIG. 3 can be relatively low, so that wear caused when the conductive fiber ring 32 moves relative to the transmission pillar 71 is relatively slight, and the grounding ring 30 can have a relatively long service life.

In some implementations of this disclosure, the motor 100 may include a plurality of grounding rings 30, the plurality of grounding rings 30 are disposed coaxially, and each grounding ring 30 is electrically connected to the rotating shaft 20 and the housing 10. This ensures a better electrical connection effect between the rotating shaft 20 and the housing 10. In addition, because there is the plurality of grounding rings 30, when one of the grounding rings 30 is damaged, another grounding ring 30 can continue to function as an electrical connection. This further prolongs a protection function of the grounding ring 30 on a conductive bearing 63, so that the conductive bearing 63 can be effectively prevented from bearing electric corrosion for a long time. In the implementations of this disclosure, the plurality of grounding rings 30 are all located in the sealing space 214. This avoids impact on conduction performance of the grounding ring 30 that is caused due to scouring or soaking of cooling water or cooling oil on the grounding ring 30, so as to ensure that the grounding ring 30 can have a relatively long service life and can always have good conduction performance. In this way, the shaft induced voltage on the rotating shaft 20 can be well transmitted to the housing 10 through the grounding ring 30 in a long time period, so as to ensure, in a long time period, that the motor bearing 63 does not encounter bearing electric corrosion, thereby ensuring a service life of the motor bearing 63.

Figure 10:
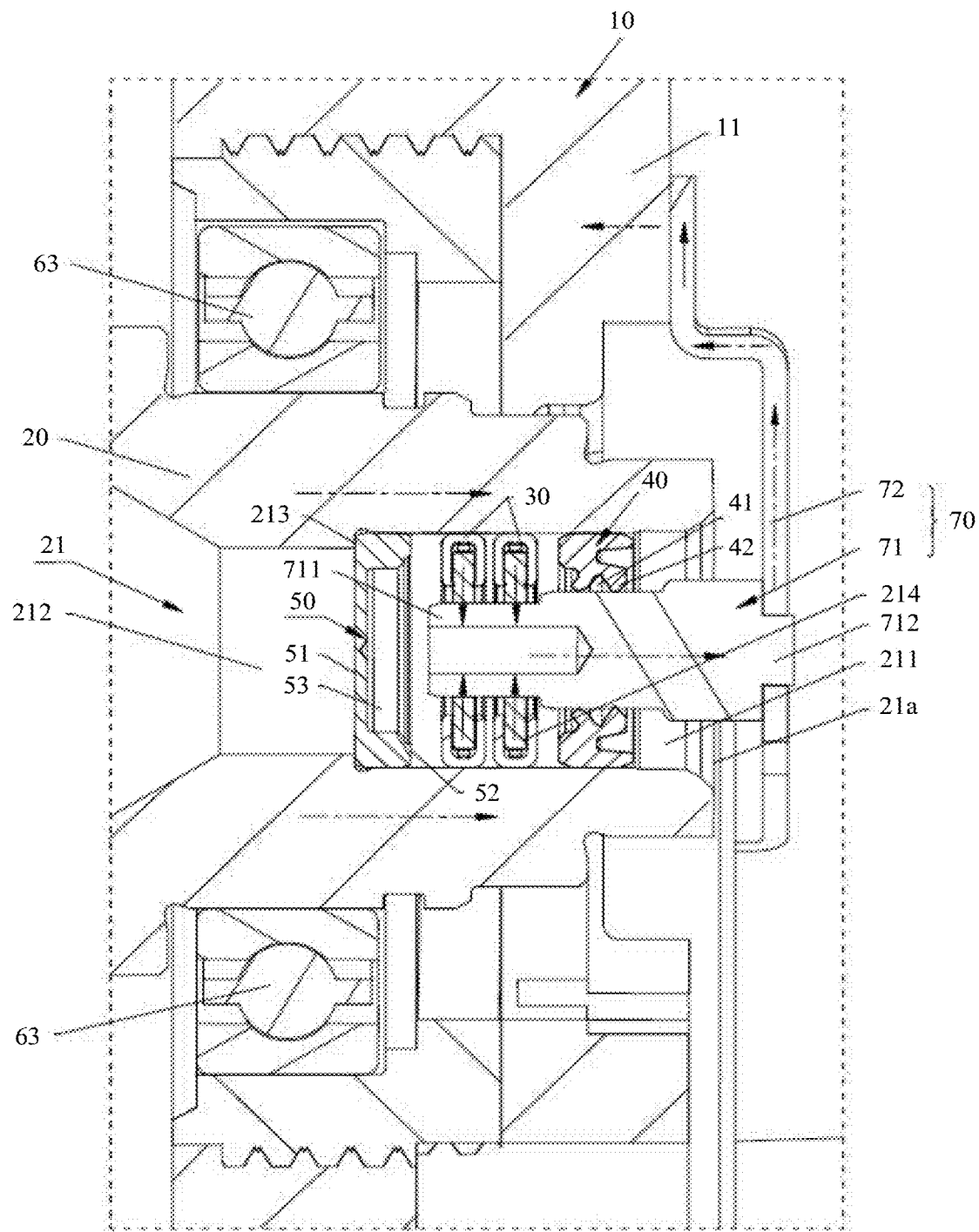
FIG. 10 is a schematic diagram of a partial cross-section of a motor according to another implementation of this disclosure.

FIG. 10 is a schematic diagram of a partial cross-section of a motor 100 according to another implementation of this disclosure. A structure of the motor 100 in this implementation is basically the same as that of the motor 100 in the implementation shown in FIG. 4. A difference between the motor 100 in this implementation and the motor 100 in the implementation shown in FIG. 4 lies in that in this implementation, there are two grounding rings 30, and the two grounding rings 30 are located on a side that is of the first sealing piece 40 and that faces the end cover 12, so that the two grounding rings 30 are located in the sealing space 214. The two grounding rings 30 are sleeved on the transmission pillar 71, and are disposed in parallel along an axial direction of the transmission pillar 71. The two grounding rings 30 each are in an interference fit with the transmission pillar 71 and the rotating shaft 20, so that the two grounding rings 30 can be stably fastened to the rotating shaft 20, and can function as a good electrical connection between the rotating shaft 20 and the transmission pillar 71. It may be understood that, in some implementations of this disclosure, there may alternatively be three, four, or more grounding rings 30, and a quantity of grounding rings 30 is not specifically limited in this disclosure.

Figure 11:
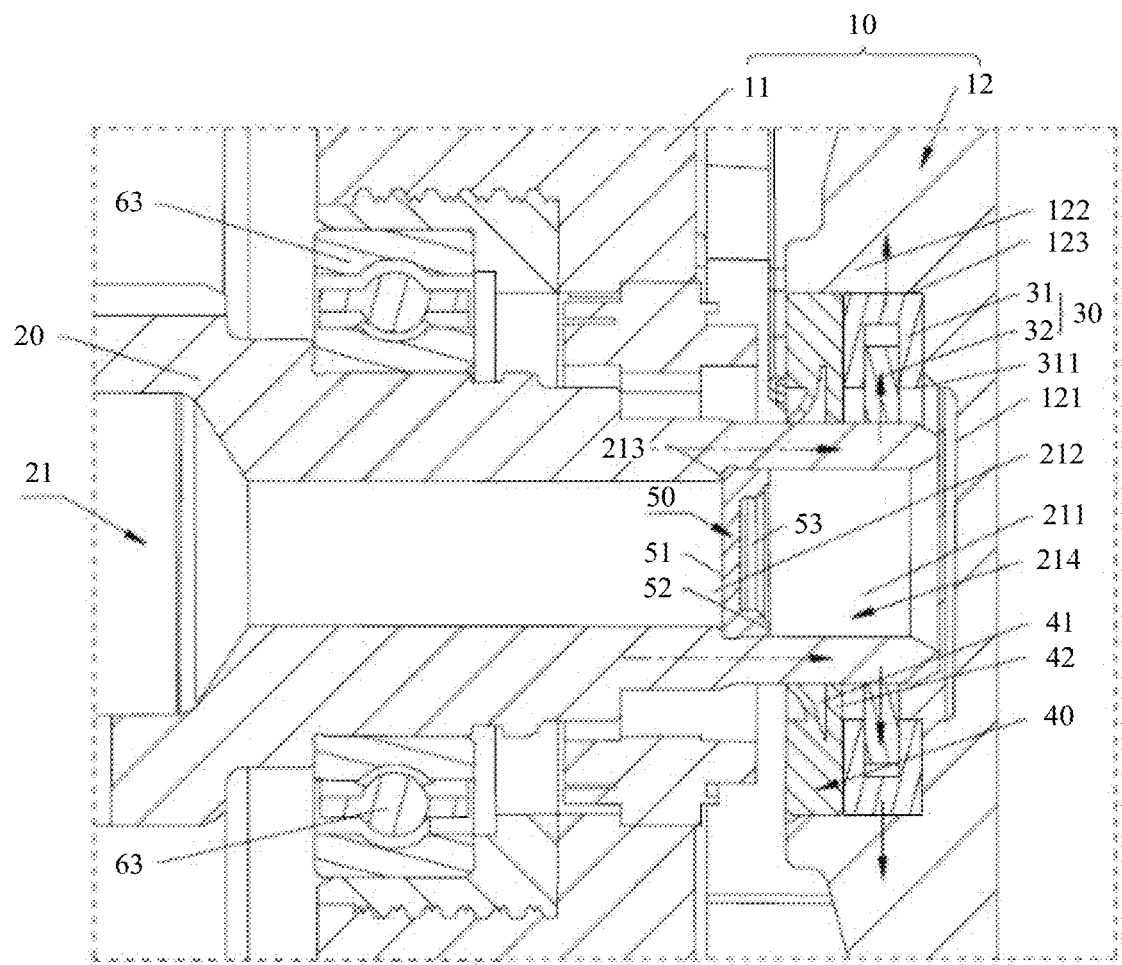
FIG. 11 is a schematic diagram of a partial cross-section of a motor according to another implementation of this disclosure.

FIG. 11 is a schematic diagram of a partial cross-section of a motor 100 according to another implementation of this disclosure. Structures of the motors 100 in this implementation and the implementation shown in FIG. 3 are basically the same, and each include the housing 10, the rotating shaft 20, the grounding ring 30, the first sealing piece 40, the second sealing piece 50, the rotor 62, the stator 61, the motor bearing 63, and the like. A difference between the motors 100 in this implementation and the implementation shown in FIG. 3 lies in that in this implementation, the motor 100 does not include a conductive piece 90, the end cover 12 includes an inner surface 121 facing the inside of the housing 10, the inner surface 121 is provided with an annular protrusion 122, and an area surrounded by the annular protrusion 122 is an installation cavity 123. An opening of the installation cavity 123 faces the rotating shaft 20, and one end of the rotating shaft 20 extends into the installation cavity 123. Both the grounding ring 30 and the first sealing piece 40 are sleeved on the end that is of the rotating shaft 20 and that extends into the installation cavity 123, and the grounding ring 30 and at least a part of the first sealing piece 40 are accommodated and installed in the installation cavity 123. In this implementation, both the grounding ring 30 and the first sealing piece 40 are completely accommodated in the installation cavity 123. Inner ring surfaces of both the grounding ring 30 and the first sealing piece 40 are in contact with the rotating shaft 20, and outer ring surfaces of both the grounding ring 30 and the first sealing piece 40 are in contact with an inner wall surface of the installation cavity 123, so that the rotating shaft 20 and the annular protrusion 122 can be connected by using the grounding ring 30. The shaft induced voltage transmitted on the rotating shaft 20 can be transmitted to the annular protrusion 122 through the grounding ring 30, and then transmitted to the end cover 12 of the housing 10 through the annular protrusion 122. In addition, the inner ring surface of the first sealing piece 40 is in contact with the rotating shaft 20, and the outer ring surface of the first sealing piece 40 is in contact with an inner wall surface of the installation cavity 123, so that the first sealing piece 40 and the second sealing piece 50 can seal the first area 211 of the axial cavity 21 and the installation cavity 123 through cooperation to form the sealing space 214. An arrow direction in FIG. 11 is a transmission direction of the shaft induced voltage of the motor 100 in this implementation. In this implementation, the shaft induced voltage transmitted on the rotating shaft 20 is first transmitted to the annular protrusion 122 through the grounding ring 30, then is transmitted to the end cover 12 of the housing 10 through the annular protrusion 122, and is grounded through the end cover 12.

In this implementation, the grounding ring 30 is located on a side that is of the first sealing piece 40 and that is away from the end cover 12, that is, the grounding ring 30 is located in the sealing space 214, to avoid contact between cooling water or cooling oil in the motor 100 and the grounding ring 30, and then avoid impact on conduction performance and a life of the grounding ring 30 that is caused due to scouring or soaking of cooling water or cooling oil on the grounding ring 30, so as to ensure that the grounding ring 30 can have a relatively long service life and can always have good conduction performance. In this way, the shaft induced voltage on the rotating shaft 20 can be well transmitted to the housing 10 through the grounding ring 30 in a long time period, so as to ensure, in a long time period, that the motor bearing 63 does not encounter bearing electric corrosion, thereby ensuring a service life of the motor bearing 63.

In this implementation, when the first sealing piece 40 is sleeved on the rotating shaft 20 and is accommodated in the installation cavity 123, the first sealing piece 40 is in an interference fit with both the annular protrusion 122 and the rotating shaft 20. When the first sealing piece 40 is in an interference fit with the annular protrusion 122, a radial dimension of an outer ring surface of the first sealing piece 40 is slightly greater than an inner diameter of the annular protrusion 122. Therefore, when the first sealing piece 40 is disposed in the installation cavity 123, the first sealing piece 40 can be stably fastened in the installation cavity 123, so that the first sealing piece 40 can be fastened to the end cover 12. When the first sealing piece 40 is in an interference fit with the rotating shaft 20, a radial dimension of an inner ring surface of the first sealing piece 40 is slightly less than the inner diameter of the annular protrusion 122. Therefore, when the first sealing piece 40 is sleeved on the rotating shaft 20, the inner ring surface of the first sealing piece 40 can tightly fit an outer surface of the rotating shaft 20. This ensures that the first sealing piece 40 can better seal a gap between the annular protrusion 122 and the rotating shaft 20, so that the first sealing piece 40 and the second sealing piece 50 can seal the first area 211 of the axial cavity 21 and the installation cavity 123 through cooperation to form the sealing space 214.

In this implementation, because the first sealing piece 40 is fastened to the end cover 12, when the rotating shaft 20 rotates, the rotating shaft 20 can rotate relative to the end cover 12, and when the rotating shaft 20 moves axially, the rotating shaft 20 can move axially with the end cover 12. In some implementations of this disclosure, at least one groove 41 is annularly disposed on the inner ring surface of the first sealing piece 40, and an annular convex strip 42 is formed between adjacent grooves 41. When the first sealing piece 40 is sleeved on the rotating shaft 20, the annular convex strip 42 between the grooves 41 is in contact with the rotating shaft 20. Because the annular convex strip 42 is relatively thin, and is easy to deform, when the rotating shaft 20 rotates relative to or moves axially relative to the first sealing piece 40, a relative movement resistance between the first sealing piece 40 and the rotating shaft 20 can be relatively small, so that the rotating shaft 20 can move more smoothly, damage caused by stress on the first sealing piece 40 during relative movement between the rotating shaft 20 and the first sealing piece 40 can be avoided, and the life of the first sealing piece 40 can be ensured.

It may be understood that, in some other implementations of this disclosure, the first sealing piece 40 may include a rubber ring and an annular convex strip connected to an inner ring of the rubber ring. There is a gap between the inner ring of the rubber ring and the rotating shaft 20. However, an inner diameter of an annular structure surrounded by the annular convex strip is slightly less than a radial dimension at a position of the first sealing piece 40 on the rotating shaft 20, that is, the first sealing piece 40 in this implementation is also in an interference fit with the rotating shaft 20. In addition, because the annular convex strip is relatively thin, and is easy to deform, when the rotating shaft 20 rotates relative to or moves axially relative to the first sealing piece 40, a relative movement resistance between the first sealing piece 40 and the rotating shaft 20 can be relatively small, so that the rotating shaft 20 can move more smoothly, damage caused by stress during relative movement between the rotating shaft 20 and the first sealing piece 40 can be avoided, and the life of the first sealing piece 40 can be ensured.

In this implementation, the conductive fiber ring 32 of the grounding ring 30 is fastened to the inner ring surface 311 of the conductive ring 31. When the grounding ring 30 is sleeved on the rotating shaft 20, the grounding ring 30 is in an interference fit with both the rotating shaft 20 and the annular protrusion 122. In this implementation, that the grounding ring 30 is in an interference fit with the annular protrusion 122 means that a radial dimension of the outer ring surface 312 of the conductive ring 31 of the grounding ring 30 is slightly greater than a radial dimension at a position of the grounding ring 30 in the installation cavity 123. When the grounding ring 30 is disposed in the installation cavity 123, the grounding ring 30 can be stably fastened in the installation cavity 123. In addition, when the grounding ring 30 is in an interference fit with the installation cavity 123, there can be a good contact effect between the grounding ring 30 and the annular protrusion 122. Therefore, the shaft induced voltage transmitted to the grounding ring 30 can be better transmitted to the annular protrusion 122, and then transmitted to the end cover 12 of the housing 10 through the annular protrusion 122. That the grounding ring 30 is in an interference fit with the rotating shaft 20 means that an inner diameter of the conductive fiber ring 32 of the grounding ring 30 is slightly less than a radial dimension of an outer surface at a position of the grounding ring 30 on the rotating shaft 20. Therefore, when the grounding ring 30 is sleeved on the rotating shaft 20, there can be good contact between the rotating shaft 20 and the conductive fiber ring 32, that is, there is a good electrical connection effect between the grounding ring 30 and the rotating shaft 20. It may be understood that in this implementation, the conductive fiber ring 32 of the grounding ring 20 may alternatively be fastened to the outer ring surface 312 of the conductive ring 31. In this case, the inner ring surface of the conductive ring 31 is in contact with the rotating shaft 20, and the outer ring surface of the conductive fiber ring 32 is in contact with the annular protrusion 122.

In this implementation, both the grounding ring 30 and the first sealing piece 40 are accommodated in the installation cavity 123, the grounding ring 30 and the first sealing piece 40 each are in an interference fit with the annular protrusion 122, and both the grounding ring 30 and the sealing piece 40 can be fastened to the annular protrusion 122. Therefore, when the end cover 12 is removed from the housing body 11, the sealing piece 40 and the grounding ring 30 may be removed together with the end cover 12, or when the end cover 12 is removed from the housing body 11, the sealing piece 40 and the grounding ring 30 are close to an opening of the housing body 11, to facilitate removal and replacement of the sealing piece 40 and the grounding ring 30, and facilitate subsequent maintenance of the motor 100.

Figure 12:
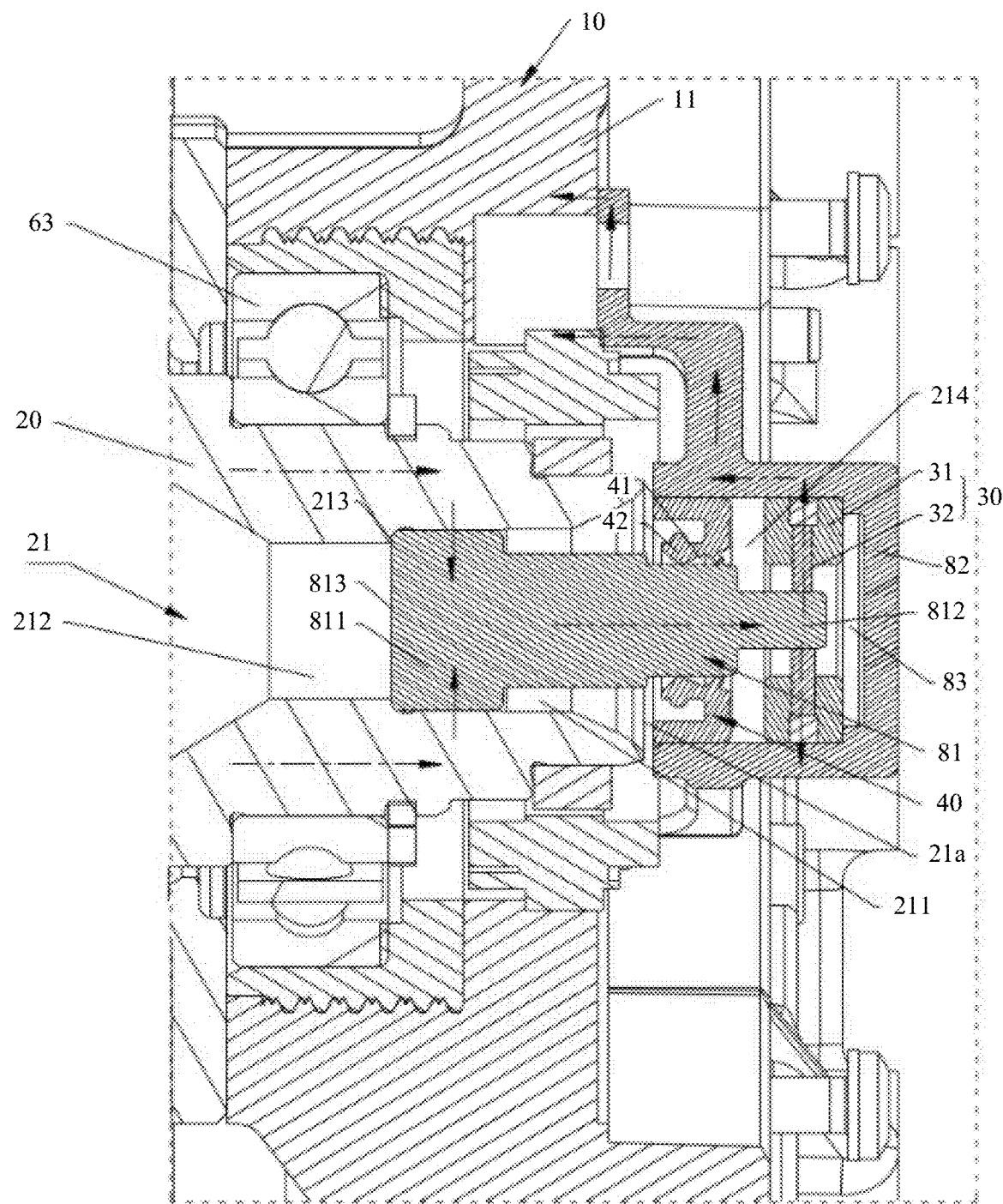
FIG. 12 is a schematic diagram of a partial cross-section of a motor according to another implementation of this disclosure.

FIG. 12 is a schematic diagram of a partial cross-section of a motor 100 according to another implementation of this disclosure. Structures of the motor 100 in this implementation and the motor 100 shown in FIG. 3 are basically the same, and each include the housing 10, the rotating shaft 20, the grounding ring 30, the first sealing piece 40, the stator 61, the rotor 62, the motor bearing 63, and the like. A difference between the motor in this implementation and the motor 100 shown in FIG. 3 lies in that the motor 100 in this implementation does not include the second sealing piece 50 or the transmission piece 70. In this implementation, the motor 100 further includes a conductive pillar 81 and a conductive support 82, and the conductive support 82 is located on a side that is of the second end 712 of the transmission pillar 71 and that is opposite to the first end 711. In this implementation, the conductive support 82 is a conductive structure, and can be connected to the housing 10, so that a charge can be transmitted to the housing 10 through the conductive support 82.

In this implementation, the conductive pillar 81 includes a first end 811 and a second end 812 that are opposite to each other. The first end 811 of the conductive pillar 81 extends into the axial cavity 21 from the first opening 21a of the rotating shaft 20, and the first end 811 of the conductive pillar 81 is fastened to the rotating shaft 20 and electrically connected to the rotating shaft 20. Specifically, in this implementation, the first end 811 of the conductive pillar 81 is in an interference fit with the rotating shaft 20, so that the first end 811 of the conductive pillar 81 is fastened to the rotating shaft 20 and electrically connected to the rotating shaft 20. In this implementation, that the first end 811 of the conductive pillar 81 is in an interference fit with the rotating shaft 20 means that a radial dimension of the first end 811 of the conductive pillar 81 is slightly greater than a radial dimension at a position of the first end 811 of the conductive pillar 81 in the axial cavity 21. When the first end 811 of the conductive pillar 81 extends into the axial cavity 21, there can be a force between the conductive pillar 81 and the rotating shaft 20, so that the conductive pillar 81 can be stably fastened to the rotating shaft 20. In addition, because the first end 811 of the conductive pillar 81 is in an interference fit with the rotating shaft 20, that is, an outer surface of the first end 811 of the conductive pillar 81 can be in close contact with the inner wall of the axial cavity 21 of the rotating shaft 20, it is ensured that there is a good electrical connection effect between the conductive pillar 81 and the rotating shaft 20, and the shaft induced voltage transmitted on the rotating shaft 20 can be easily transmitted to the conductive pillar 81. In addition, the outer surface of the first end 811 of the conductive pillar 81 is in close contact with the inner wall of the axial cavity 21 of the rotating shaft 20, that is, there is no gap between the outer surface of the first end 811 of the conductive pillar 81 and the inner wall of the axial cavity 21 of the rotating shaft 20, so that different areas of the axial cavity 21 can be separated by using the conductive pillar 81. In this implementation, an end surface 813 that is of the conductive pillar 81 and that is close to the first end 811 abuts against the connection surface 213 of the inner wall of the axial cavity 21, so that the first area 211 and the second area 212 of the axial cavity 21 are separated by using the first end 811 of the conductive pillar 81.

It may be understood that, in some implementations of this disclosure, the first end 811 of the conductive pillar 81 may alternatively not be in an interference fit with the rotating shaft 20. To be specific, a radial dimension of the first end 811 of the conductive pillar 81 is basically the same as a radial dimension at a position of the first end 811 of the conductive pillar 81 in the axial cavity 21. Therefore, an outer surface of the first end 811 of the conductive pillar 81 can be in contact with the inner wall of the axial cavity 21 of the rotating shaft 20, so that the first area 211 and the second area 212 are separated, and an electrical connection between the conductive pillar 81 and the rotating shaft 20 can be implemented. In some implementations, fastening between the conductive pillar 81 and the rotating shaft 20 may be implemented in a fastening manner such as screw-based fastening, so that the conductive pillar 81 can rotate with the rotating shaft 20.

In this implementation, a groove 83 is disposed on the conductive support 82, an opening of the groove 83 faces the conductive pillar 81, and the second end 812 of the conductive pillar 81 extends into the groove 83. In this implementation, both the first sealing piece 40 and the grounding ring 30 are annular, both the first sealing piece 40 and the grounding ring 30 are sleeved on the second end 812 of the conductive pillar 81, the inner ring surface of the first sealing piece 40 is in contact with the conductive pillar 81, and the outer ring surface of the first sealing piece 40 is in contact with a groove wall of the groove 83, that is, the first sealing piece 40 can seal a gap between the conductive pillar 81 and the groove wall of the groove 83. In addition, in this implementation, the second end 812 of the conductive pillar 81 is a solid structure. Therefore, in this implementation, the first sealing piece 40 and the second end 812 of the conductive pillar 81 can seal the groove 83, so that the first sealing piece 40 can seal the groove 41 to form the sealing space 214. In this implementation, the inner ring surface of the grounding ring 30 is in contact with the conductive pillar 81, and the outer ring surface of the grounding ring 30 is in contact with the groove wall of the groove 83, so that the grounding ring 30 can be electrically connected to the conductive support 82 and the conductive pillar 81, and a charge transmitted on the conductive pillar 81 can be transmitted to the conductive support 82 through the grounding ring 30, and then transmitted to the housing 10 through the conductive support 82. To be specific, in this implementation, a transmission direction of the shaft induced voltage transmitted on the rotating shaft 20 is shown by a direction indicated by an arrow in FIG. 12. The shaft induced voltage transmitted on the rotating shaft 20 is transmitted to the grounding ring 30 through the conductive pillar 81, then the grounding ring 30 transmits the shaft induced voltage to the conductive support 82, and the shaft induced voltage is transmitted to the housing 10 through the conductive support 82, to avoid transmission of the shaft induced voltage from a motor bearing 63 to the housing 10, so as to avoid bearing electric corrosion of the motor bearing 63, and ensure a life of the motor bearing 63.

In this implementation, the grounding ring 30 is located on a side that is of the first sealing piece 40 and that is away from the first end 811 of the conductive pillar 81, that is, the grounding ring 30 is located in the sealing space 214, to avoid contact between cooling water or cooling oil in the motor 100 and the grounding ring 30, and then avoid impact on conduction performance and a life of the grounding ring 30 that is caused due to scouring or soaking of cooling water or cooling oil on the grounding ring 30, so as to ensure that the grounding ring 30 can have a relatively long service life and can always have good conduction performance. In this way, the shaft induced voltage on the rotating shaft 20 can be well transmitted to the housing 10 through the grounding ring 30 in a long time period, so as to ensure, in a long time period, that the motor bearing 63 does not encounter bearing electric corrosion, thereby ensuring a service life of the motor bearing 63.

It may be understood that in this implementation, there may be a plurality of grounding rings 30, the plurality of grounding rings 30 are all sleeved on the second end 812 of the conductive pillar 81, and the plurality of grounding rings 30 are coaxially disposed. An outer ring surface of each grounding ring 30 is in contact with the groove wall of the groove of the conductive support 82, and an inner ring surface of each grounding ring 30 is in contact with the second end 812 of the conductive pillar 81, so that each grounding ring 30 is electrically connected to the rotating shaft 20 and the housing 10, thereby ensuring a better electrical connection effect between the rotating shaft 20 and the housing 10. Because there is the plurality of grounding rings 30, when one of the grounding rings 30 is damaged, another grounding ring 30 can continue to function as an electrical connection. This further prolongs a protection function of the grounding ring 30 on a conductive bearing 63, so that the conductive bearing 63 can be effectively prevented from bearing electric corrosion for a long time. In addition, the plurality of grounding rings 30 are all located in the sealing space 214. This avoids impact on conduction performance and a life of the grounding ring 30 that is caused due to scouring or soaking of cooling water or cooling oil on the grounding ring 30, so as to ensure that the grounding ring 30 can have a relatively long service life and can always have good conduction performance. In this way, the shaft induced voltage on the rotating shaft 20 can be well transmitted to the housing 10 through the grounding ring 30 in a long time period, so as to ensure, in a long time period, that the motor bearing 63 does not encounter bearing electric corrosion, thereby ensuring a service life of the motor bearing 63.

In some implementations of this disclosure, the first sealing piece 40 is in an interference fit with the conductive support 82 and the second end 812 of the conductive pillar 81. When the first sealing piece 40 is in an interference fit with the conductive support 82, a radial dimension of an outer ring surface of the first sealing piece 40 is slightly greater than an inner diameter of the groove wall of the groove 83 of the conductive support 82. Therefore, when the first sealing piece 40 is disposed in the groove 83, the first sealing piece 40 can be stably fastened in the groove 83, so that the first sealing piece 40 can be fastened to the conductive support 82. When the first sealing piece 40 is in an interference fit with the conductive pillar 81, a radial dimension of an inner ring surface of the first sealing piece 40 is slightly less than a radial dimension of the second end 812 of the conductive pillar 81. Therefore, when the first sealing piece 40 is sleeved on the second end 812 of the conductive pillar 81, the inner ring surface of the first sealing piece 40 can tightly fit an outer surface of the second end 812 of the conductive pillar 81, to ensure that the first sealing piece 40 can better seal a gap between the groove wall of the groove 83 and the second end 812 of the conductive pillar 81, so that the first sealing piece 40 can seal the groove 83 to form the sealing space 214, to prevent external cooling water, cooling oil, or the like from entering the sealing space 214.

In this implementation, because the first sealing piece 40 can be stably fastened to the groove 83, when the rotating shaft 20 rotates to drive the conductive pillar 81 to rotate, the conductive pillar 81 and the first sealing piece 40 can rotate relative to each other. When the rotating shaft 20 drives the conductive pillar 81 to move axially, the conductive pillar 81 can also move axially relative to the first sealing piece 40. In some implementations of this disclosure, at least one groove 41 is annularly disposed on the inner ring surface of the first sealing piece 40, and an annular convex strip 42 is formed between adjacent grooves 41. When the first sealing piece 40 is sleeved on the rotating shaft 20, the annular convex strip 42 between the grooves 41 is in contact with the rotating shaft 20. Because the annular convex strip 42 is relatively thin, and is easy to deform, when the conductive pillar 81 rotates relative to or moves axially relative to the first sealing piece 40, a relative movement resistance between the first sealing piece 40 and the conductive pillar 81 can be relatively small, so that the rotating shaft 20 can move more smoothly, damage caused by stress on the first sealing piece 40 during relative movement between the rotating shaft 20 and the first sealing piece 40 can be avoided, and the life of the first sealing piece 40 can be ensured.

In some implementations of this disclosure, the grounding ring 30 is in an interference fit with the conductive support 82 and the second end 812 of the conductive pillar 81. In this implementation, the conductive fiber ring 32 of the grounding ring 30 is fastened to the inner ring surface 311 of the conductive ring 31. When the grounding ring 30 is sleeved on the rotating shaft 20, the grounding ring 30 is in an interference fit with both the conductive pillar 81 and the conductive support 82. In this implementation, that the grounding ring 30 is in an interference fit with the conductive support 82 means that a radial dimension of the outer ring surface 312 of the conductive ring 31 of the grounding ring 30 is slightly greater than a radial dimension of the groove wall of the groove 83. When the grounding ring 30 is disposed in the groove 83, the grounding ring 30 can be stably fastened in the groove 83. In addition, when the grounding ring 30 is in an interference fit with the conductive support 82, there can be a good contact effect between the grounding ring 30 and the conductive support 82. Therefore, the shaft induced voltage transmitted to the grounding ring 30 can be better transmitted to the conductive support 82, and then transmitted to the housing 10 through the conductive support 82. That the grounding ring 30 is in an interference fit with the rotating shaft 20 means that an inner diameter of the conductive fiber ring 32 of the grounding ring 30 is slightly less than a radial dimension of an outer surface at a position of the grounding ring 30 on the rotating shaft 20. Therefore, when the grounding ring 30 is sleeved on the rotating shaft 20, there can be good contact between the rotating shaft 20 and the conductive fiber ring 32, that is, there is a good electrical connection effect between the grounding ring 30 and the rotating shaft 20. It may be understood that in this implementation, the conductive fiber ring 32 of the grounding ring 20 may alternatively be fastened to the outer ring surface 312 of the conductive ring 31. In this case, the inner ring surface of the conductive ring 31 is in contact with the rotating shaft 20, and the outer ring surface of the conductive fiber ring 32 is in contact with the conductive support 82.

In this implementation, both the grounding ring 30 and the first sealing piece 40 are accommodated in the groove 83, the grounding ring 30 and the first sealing piece 40 each are in an interference fit with the conductive support 82, and both the grounding ring 30 and the sealing piece 40 can be fastened to the conductive support 82. Therefore, when the end cover 12 is removed from the housing body 11, the sealing piece 40 and the grounding ring 30 may be removed together with the end cover 12, or when the end cover 12 is removed from the housing body 11, the sealing piece 40 and the grounding ring 30 are close to an opening of the housing body 11, to facilitate removal and replacement of the sealing piece 40 and the grounding ring 30, and facilitate subsequent maintenance of the motor 100.

Figure 13:
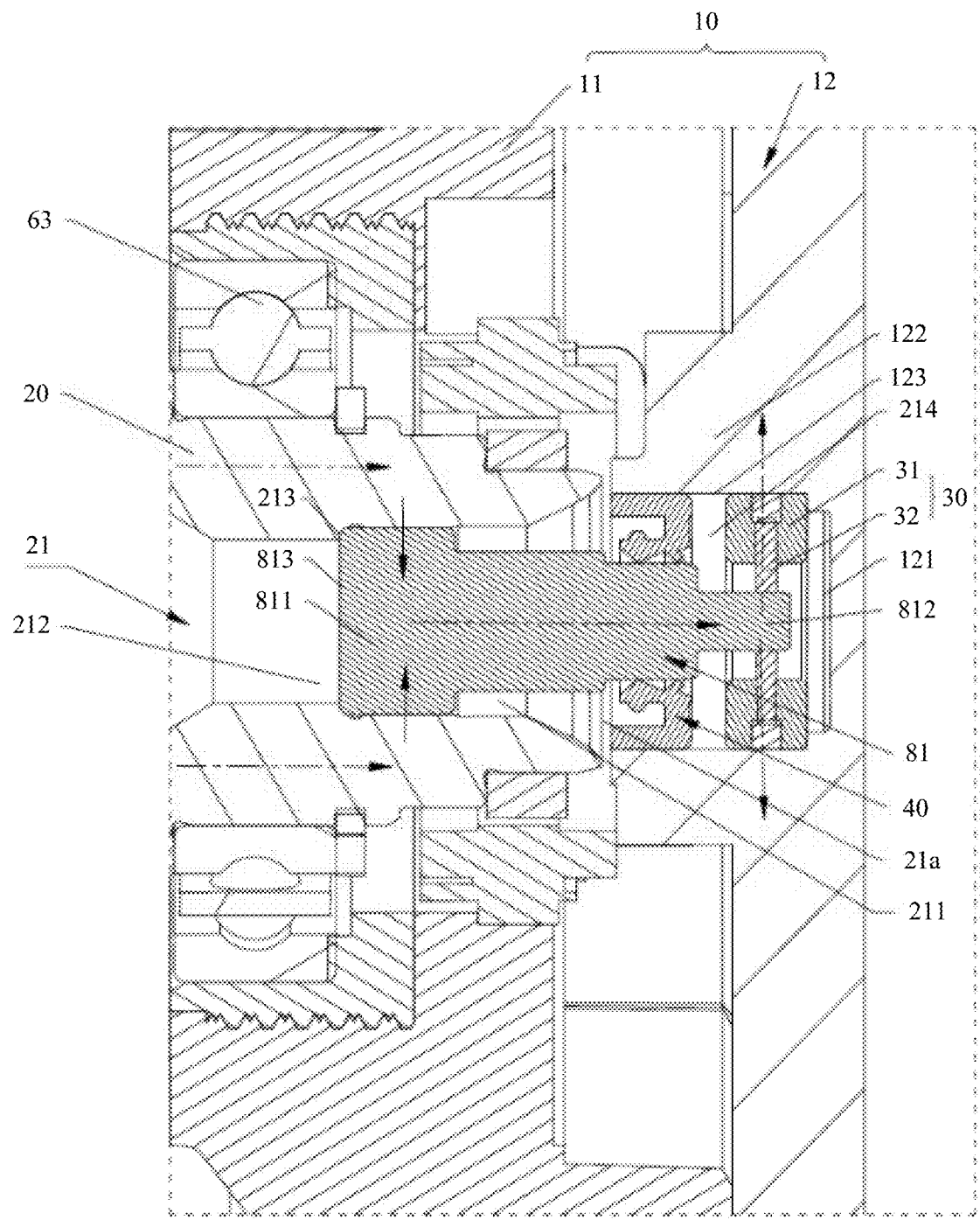
FIG. 13 is a schematic diagram of a partial cross-section of a motor according to another implementation of this disclosure.

FIG. 13 is a schematic diagram of a partial cross-section of a motor 100 according to another implementation of this disclosure. Structures of the motor 100 in this implementation and the motor 100 shown in FIG. 12 are basically the same, and each include the housing 10, the rotating shaft 20, the grounding ring 30, the first sealing piece 40, the conductive pillar 81, the stator 61, the rotor 62, the motor bearing 63, and the like. A difference between the motor 100 in this implementation and the motor 100 shown in FIG. 12 lies in that the motor 100 in this implementation does not include the conductive support 82. A structure of the end cover 12 in this implementation is basically the same as that of the end cover 12 in the implementation shown in FIG. 11. In other words, in this implementation, the annular protrusion 122 is disposed on the inner surface 121 that is of the end cover 12 and that faces the inside of the housing 10, and the installation cavity 123 is surrounded by the conductive support 82.

In this implementation, an opening of the installation cavity 123 faces the conductive pillar 81, and the second end 812 of the conductive pillar 81 extends into the installation cavity 123. Both the grounding ring 30 and the first sealing piece 40 are sleeved on the end that is of the rotating shaft 20 and that extends into the installation cavity 123, and the grounding ring 30 and at least a part of the first sealing piece 40 are accommodated and installed in the installation cavity 123. In this implementation, both the grounding ring 30 and the first sealing piece 40 are completely accommodated in the installation cavity 123. Inner ring surfaces of both the grounding ring 30 and the first sealing piece 40 are in contact with the rotating shaft 20, and outer ring surfaces of both the grounding ring 30 and the first sealing piece 40 are in contact with an inner wall surface of the installation cavity 123, so that the conductive pillar 81 and the annular protrusion 122 can be connected by using the grounding ring 30. To be specific, a transmission path of the shaft induced voltage of the motor 100 in this implementation is shown by a current direction in FIG. 13. The shaft induced voltage transmitted on the rotating shaft 20 is first transmitted to the conductive pillar 81, then transmitted to the grounding ring 30 through the conductive pillar 81, then transmitted to the annular protrusion 122 through the grounding ring 30, and then transmitted to the end cover 12 of the housing 10 through the annular protrusion 122.

In addition, the inner ring surface of the first sealing piece 40 is in contact with the conductive pillar 81, and the outer ring surface of the first sealing piece 40 is in contact with the inner wall surface of the installation cavity 123. Because the second end 812 of the conductive pillar 81 is a solid structure, in this implementation, the first sealing piece 40 and the second end 812 of the conductive pillar 81 can seal the installation cavity 123 to form the sealing space 214. In this implementation, the grounding ring 30 is located on a side that is of the first sealing piece 40 and that is away from the first end 811 of the conductive pillar 81, that is, the grounding ring 30 is located in the sealing space 214, to avoid contact between cooling water or cooling oil in the motor 100 and the grounding ring 30, and then avoid impact on conduction performance and a life of the grounding ring 30 that is caused due to scouring or soaking of cooling water or cooling oil on the grounding ring 30, so as to ensure that the grounding ring 30 can have a relatively long service life and can always have good conduction performance. In this way, the shaft induced voltage on the rotating shaft 20 can be well transmitted to the housing 10 through the grounding ring 30 in a long time period, so as to ensure, in a long time period, that the motor bearing 63 does not encounter bearing electric corrosion, thereby ensuring a service life of the motor bearing 63.

In this implementation, there may be a plurality of grounding rings 30, the plurality of grounding rings 30 are all sleeved on the second end 812 of the conductive pillar 81, and the plurality of grounding rings 30 are coaxially disposed. An outer ring surface of each grounding ring 30 is in contact with a cavity wall of the installation cavity 123, and an inner ring surface of each grounding ring 30 is in contact with the second end 812 of the conductive pillar 81, so that each grounding ring 30 is electrically connected to the rotating shaft 20 and the housing 10, thereby ensuring a better electrical connection effect between the rotating shaft 20 and the housing 10. Because there is the plurality of grounding rings 30, when one of the grounding rings 30 is damaged, another grounding ring 30 can continue to function as an electrical connection. This further prolongs a protection function of the grounding ring 30 on a conductive bearing 63, so that the conductive bearing 63 can be effectively prevented from bearing electric corrosion for a long time. In addition, the plurality of grounding rings 30 are all located in the sealing space 214. This avoids impact on conduction performance and a life of the grounding ring 30 that is caused due to scouring or soaking of cooling water or cooling oil on the grounding ring 30, so as to ensure that the grounding ring 30 can have a relatively long service life and can always have good conduction performance. In this way, the shaft induced voltage on the rotating shaft 20 can be well transmitted to the housing 10 through the grounding ring 30 in a long time period, so as to ensure, in a long time period, that the motor bearing 63 does not encounter bearing electric corrosion, thereby ensuring a service life of the motor bearing 63.

In this implementation, when the first sealing piece 40 is sleeved on the rotating shaft 20 and is accommodated in the installation cavity 123, the first sealing piece 40 is in an interference fit with both the annular protrusion 122 and the rotating shaft 20. When the first sealing piece 40 is in an interference fit with the annular protrusion 122, a radial dimension of an outer ring surface of the first sealing piece 40 is slightly greater than an inner diameter of the annular protrusion 122. Therefore, when the first sealing piece 40 is disposed in the installation cavity 123, the first sealing piece 40 can be stably fastened in the installation cavity 123, so that the first sealing piece 40 can be fastened to the end cover 12. When the first sealing piece 40 is in an interference fit with the rotating shaft 20, a radial dimension of an inner ring surface of the first sealing piece 40 is slightly less than the inner diameter of the annular protrusion 122. Therefore, when the first sealing piece 40 is sleeved on the rotating shaft 20, the inner ring surface of the first sealing piece 40 can tightly fit an outer surface of the rotating shaft 20. This ensures that the first sealing piece 40 can better seal a gap between the annular protrusion 122 and the rotating shaft 20, so that the first sealing piece 40 and the second sealing piece 50 can seal the first area 211 of the axial cavity 21 and the installation cavity 123 through cooperation to form the sealing space 214.

In this implementation, because the first sealing piece 40 is fastened to the end cover 12, when the rotating shaft 20 rotates, the rotating shaft 20 can rotate relative to the end cover 12, and when the rotating shaft 20 moves axially, the rotating shaft 20 can move axially with the end cover 12. In some implementations of this disclosure, at least one groove 41 is annularly disposed on the inner ring surface of the first sealing piece 40, and an annular convex strip 42 is formed between adjacent grooves 41. When the first sealing piece 40 is sleeved on the rotating shaft 20, the annular convex strip 42 between the grooves 41 is in contact with the rotating shaft 20. Because the annular convex strip 42 is relatively thin, and is easy to deform, when the rotating shaft 20 rotates relative to or moves axially relative to the first sealing piece 40, a relative movement resistance between the first sealing piece 40 and the rotating shaft 20 can be relatively small, so that the rotating shaft 20 can move more smoothly, damage caused by stress on the first sealing piece 40 during relative movement between the rotating shaft 20 and the first sealing piece 40 can be avoided, and the life of the first sealing piece 40 can be ensured.

It may be understood that, in some other implementations of this disclosure, the first sealing piece 40 may include a rubber ring and an annular convex strip connected to an inner ring of the rubber ring. There is a gap between the inner ring of the rubber ring and the rotating shaft 20. However, an inner diameter of an annular structure surrounded by the annular convex strip is slightly less than a radial dimension at a position of the first sealing piece 40 on the rotating shaft 20, that is, the first sealing piece 40 in this implementation is also in an interference fit with the rotating shaft 20. In addition, because the annular convex strip is relatively thin, and is easy to deform, when the rotating shaft 20 rotates relative to or moves axially relative to the first sealing piece 40, a relative movement resistance between the first sealing piece 40 and the rotating shaft 20 can be relatively small, so that the rotating shaft 20 can move more smoothly, damage caused by stress during relative movement between the rotating shaft 20 and the first sealing piece 40 can be avoided, and the life of the first sealing piece 40 can be ensured.

In this implementation, the conductive fiber ring 32 of the grounding ring 30 is fastened to the inner ring surface 311 of the conductive ring 31. When the grounding ring 30 is sleeved on the rotating shaft 20, the grounding ring 30 is in an interference fit with both the rotating shaft 20 and the annular protrusion 122. In this implementation, that the grounding ring 30 is in an interference fit with the annular protrusion 122 means that a radial dimension of the outer ring surface 312 of the conductive ring 31 of the grounding ring 30 is slightly greater than a radial dimension at a position of the grounding ring 30 in the installation cavity 123. When the grounding ring 30 is disposed in the installation cavity 123, the grounding ring 30 can be stably fastened in the installation cavity 123. In addition, when the grounding ring 30 is in an interference fit with the installation cavity 123, there can be a good contact effect between the grounding ring 30 and the annular protrusion 122. Therefore, the shaft induced voltage transmitted to the grounding ring 30 can be better transmitted to the annular protrusion 122, and then transmitted to the end cover 12 of the housing 10 through the annular protrusion 122. That the grounding ring 30 is in an interference fit with the rotating shaft 20 means that an inner diameter of the conductive fiber ring 32 of the grounding ring 30 is slightly less than a radial dimension of an outer surface at a position of the grounding ring 30 on the rotating shaft 20. Therefore, when the grounding ring 30 is sleeved on the rotating shaft 20, there can be good contact between the rotating shaft 20 and the conductive fiber ring 32, that is, there is a good electrical connection effect between the grounding ring 30 and the rotating shaft 20. It may be understood that in this implementation, the conductive fiber ring 32 of the grounding ring 20 may alternatively be fastened to the outer ring surface 312 of the conductive ring 31. In this case, the inner ring surface of the conductive ring 31 is in contact with the rotating shaft 20, and the outer ring surface of the conductive fiber ring 32 is in contact with the annular protrusion 122.

In this implementation, both the grounding ring 30 and the first sealing piece 40 are accommodated in the installation cavity 123, the grounding ring 30 and the first sealing piece 40 each are in an interference fit with the annular protrusion 122, and both the grounding ring 30 and the sealing piece 40 can be fastened to the annular protrusion 122. Therefore, when the end cover 12 is removed from the housing body 11, the sealing piece 40 and the grounding ring 30 may be removed together with the end cover 12, or when the end cover 12 is removed from the housing body 11, the sealing piece 40 and the grounding ring 30 are close to an opening of the housing body 11, to facilitate removal and replacement of the sealing piece 40 and the grounding ring 30, and facilitate subsequent maintenance of the motor 100.

In this disclosure, the grounding ring 30 is electrically connected to the rotating shaft 20 and the housing 10. Because the grounding ring 30 is made of a material with good conduction performance and has better conduction performance than a motor bearing 63, a shaft induced voltage transmitted on the rotating shaft 20 can be transmitted to the housing 10 through the grounding ring 30, instead of being transmitted to the housing 10 through the motor bearing 63, thereby avoiding bearing electric corrosion of the motor bearing 63 and ensuring quality and a service life of the motor bearing 63. In addition, the grounding ring 30 in this implementation is made of the conductive ring 31 and the conductive fiber ring 32. Compared with an insulating bearing and a conductive bearing, the grounding ring has lower costs, a simpler structure, and a lower weight. Therefore, a structure of the motor 100 can be simplified, and manufacturing costs and a weight of the motor 100 can be reduced. In this disclosure, the motor 100 further includes the first sealing piece 40, or includes the first sealing piece 40 and the second sealing piece 50. The first sealing piece 40 seals a part of space in the housing 10 to obtain the sealing space 214, or the first sealing piece 40 and the second sealing piece 50 cooperate to seal a part of space in the housing to obtain the sealing space 214, and the grounding ring is located in the sealing space 214. This can avoid impact on conduction performance of the grounding ring 30 that is caused by cooling water or cooling oil in the motor 100, an external impurity, or the like. Therefore, it is ensured that the grounding ring 30 can always have good conduction performance, so that the shaft induced voltage on the rotating shaft 20 can be easily transmitted to the housing 10 through the grounding ring 30, to avoid bearing electric corrosion of the motor bearing 63, and prolong the service life of the motor bearing 63.

The foregoing descriptions are example implementations of this disclosure. It should be noted that a person of ordinary skill in the art may make several improvements or polishing without departing from the principle of this disclosure and the improvements or polishing shall fall within the protection scope of this disclosure.

What is claimed is:

1. A motor comprising:
a housing comprising a space;
a rotating shaft;
a first sealing piece accommodated in the housing and configured to seal a first part of the space to obtain a sealing space;
a second sealing piece cooperating with the first sealing piece to seal the first part to form the sealing space; and
a grounding ring accommodated in and electrically coupled to the housing and the rotating shaft,
wherein the grounding ring is a first conductive structure, and
wherein the grounding ring is located in the sealing space.

2. The motor of claim 1, wherein the rotating shaft comprises an axial cavity comprising a first opening, and wherein the motor further comprises a conductive pillar comprising:
a first end extending into the axial cavity through the first opening, wherein the first end is fastened and electrically coupled to the rotating shaft; and
a second end located opposite to the first end, wherein the first sealing piece and the grounding ring are annular and are sleeved on the second end,
wherein the first sealing piece comprises:
a first side facing away from the first end; and
a first inner ring surface that is in contact with the conductive pillar,
wherein the grounding ring comprises a second inner ring surface that is in contact with the conductive pillar, and
wherein the grounding ring is located on the first side.

3. The motor of claim 2, further comprising a conductive support coupled to the housing and located on a second side of the second end opposite to the first end, wherein the conductive support comprises a groove disposed on the conductive support, and wherein the groove comprises:
an inner wall surface in contact with an outer ring surface of the grounding ring; and
a second opening facing the conductive pillar,
wherein the second end extends into the groove,
wherein the first sealing piece seals the groove to form the sealing space.

4. The motor of claim 3, wherein the first sealing piece is in a first interference fit with the conductive support and the second end, and wherein the grounding ring is in a second interference fit with the conductive support and the second end.

5. The motor of claim 2, wherein the housing further comprises:
a housing body comprising a second opening; and
an end cover covering the second opening, wherein a first central axis of the end cover and a second central axis of the rotating shaft are collinear or parallel, wherein the end cover comprises an inner surface facing an inside of the housing, wherein an annular protrusion is disposed on the inner surface and surrounds an installation cavity, wherein a third opening of the installation cavity faces the conductive pillar, wherein the second end extends into the installation cavity, wherein the first sealing piece seals the installation cavity to form the sealing space, and wherein an outer ring surface of the grounding ring is in contact with an inner wall surface of the installation cavity.

6. The motor of claim 5, wherein the first sealing piece is in a first interference fit with the annular protrusion and the second end, and wherein the grounding ring is in a second interference fit with the annular protrusion and the second end.

7. The motor of claim 2, wherein the first end is in an interference fit with the rotating shaft to fasten and electrically couple to the rotating shaft.

8. The motor of claim 1, wherein the rotating shaft comprises an axial cavity comprising a first opening, wherein the second sealing piece is disposed in the axial cavity and configured to separate the axial cavity into:
a first area; and
a second area arranged in an axial direction, wherein the first area is closer to the first opening than the second area,
wherein the first sealing piece and the grounding ring are annular and configured to sleeve on the rotating shaft or accommodated in the axial cavity.

9. The motor of claim 8, further comprising:
a transmission piece that is a second conductive structure and comprising a transmission pillar, wherein the transmission pillar comprises:
  a first end extending into the axial cavity through the first opening; and
  a second end located opposite to the first end and coupled to the housing,
  wherein a first central axis of the transmission pillar coincides with a second central axis of the axial cavity,
  wherein a gap is comprised between the transmission pillar and an inner wall of the axial cavity,
wherein the grounding ring and the first sealing piece are accommodated in the axial cavity and sleeved on the first end, wherein a first inner ring surface of the grounding ring is in contact with the transmission pillar, wherein a first outer ring surface of the grounding ring is in contact with an inner wall surface of the axial cavity, wherein a second inner ring surface of the first sealing piece is in contact with the transmission pillar, wherein a second outer ring surface of the first sealing piece is in contact with the inner wall surface such that the first sealing piece seals the gap, wherein the first sealing piece and the second sealing piece are configured to seal a second part of the axial cavity between the first sealing piece and the second sealing piece to obtain the sealing space, and wherein the grounding ring is located on a side of the first sealing piece opposite to the second end.

10. The motor of claim 9, wherein the first sealing piece is in a first interference fit with the rotating shaft and the first end, and wherein the grounding ring is in a second interference fit with the rotating shaft and the second end.

11. The motor of claim 9, wherein the transmission piece further comprises a connection support comprising:
  a third end directly coupled to the second end; and
  a fourth end directly coupled to the housing, and
  wherein the housing further comprises:
    a housing body comprising a second opening; and
    an end cover covering the second opening, wherein a third central axis of the end cover and a fourth central axis of the rotating shaft are collinear or parallel.

12. The motor of claim 8, wherein the housing further comprises:
  a housing body comprising a second opening; and
  an end cover covering the second opening, wherein a first central axis of the end cover and a second central axis of the rotating shaft are collinear or parallel, wherein the end cover comprises an inner surface facing an inside of the housing, wherein an annular protrusion is disposed on the inner surface and surrounds an installation cavity, wherein a third opening of the installation cavity faces the rotating shaft, wherein a first end of the rotating shaft extends into the installation cavity, wherein the grounding ring and the first sealing piece are sleeved on the first end, wherein a first inner ring surface of the grounding ring and a second inner ring surface of the first sealing piece are in contact with the rotating shaft, wherein a first outer ring surface of the grounding ring and a second outer ring surface of the first sealing piece are in contact with an inner wall surface of the installation cavity, wherein the first sealing piece and the second sealing piece cooperate to seal the first area and the installation cavity to form the sealing space, and wherein the grounding ring is located on a side of the first sealing piece facing the end cover.

13. The motor of claim 12, wherein the first sealing piece is in a first interference fit with the annular protrusion and the rotating shaft, and wherein the grounding ring is in a second interference fit with the annular protrusion and the rotating shaft.

14. The motor of claim 8, wherein a first radial dimension of the first area is greater than a second radial dimension of the second area, wherein a step structure is formed at a position at which a first inner wall surface of the first area is coupled to a second inner wall surface of the second area, and wherein the second sealing piece is disposed against the step structure.

15. The motor of claim 1, wherein the grounding ring comprises:
  a conductive ring comprising:
    an inner ring surface; and
    an outer ring surface located opposite to the inner ring surface; and
  a conductive fiber ring coupled to the conductive ring, wherein the conductive fiber ring is an annular structure formed by fastening a plurality of conductive fibers on the conductive ring, and wherein the conductive fiber ring is coupled to the inner ring surface or the outer ring surface.

16. The motor of claim 1, further comprising a plurality of grounding rings disposed coaxially in the sealing space, and electrically coupled to the rotating shaft and the housing.

17. A power assembly comprising:
  a motor comprising:
    a housing comprising a space;
    a rotating shaft;
    a first sealing piece accommodated in the housing and configured to seal a first part of the space to obtain a sealing space;
    a second sealing piece cooperating with the first sealing piece to seal the first part to form the sealing space; and
    a grounding ring accommodated in and electrically coupled to the housing and the rotating shaft, wherein the grounding ring is a conductive structure, and wherein the grounding ring is located in the sealing space; and
  a motor controller electrically coupled to the motor and configured to control the motor to work.

18. A motor drive device comprising:
an installation support; and
a power assembly installed on the installation support and comprising:
  a motor comprising:
    a housing comprising a space;
    a rotating shaft;
    a first sealing piece accommodated in the housing and configured to seal a first part of the space to obtain a sealing space;
    a second sealing piece cooperating with the first sealing piece to seal the first part to form the sealing space; and
    a grounding ring accommodated in and electrically coupled to the housing and the rotating shaft, wherein the grounding ring is a conductive structure, and wherein the grounding ring is located in the sealing space; and
  a motor controller electrically coupled to the motor and configured to control the motor to work.

19. The motor drive device of claim 18, wherein the motor drive device is an electric vehicle, wherein the installation support is a vehicle frame, and wherein the power assembly is installed on the vehicle frame.

20. The motor drive device of claim 18, wherein the rotating shaft comprises an axial cavity comprising a first opening, and wherein the motor further comprises a conductive pillar comprising:
- a first end extending into the axial cavity through the first opening, wherein the first end is fastened and electrically coupled to the rotating shaft; and
- a second end located opposite to the first end, wherein the first sealing piece and the grounding ring are annular and are sleeved on the second end, wherein the first sealing piece comprises:
- a first side facing away from the first end; and
- a first inner ring surface that is in contact with the conductive pillar, wherein the grounding ring comprises a second inner ring surface that is in contact with the conductive pillar, and wherein the grounding ring is located on the first side.

* * * * *